(12) United States Patent
Judd et al.

(10) Patent No.: US 11,423,289 B2
(45) Date of Patent: Aug. 23, 2022

(54) ACCELERATOR FOR DEEP NEURAL NETWORKS

(71) Applicant: SAMSUNG ELECTRONICS CO., LTD., Suwon-si (KR)

(72) Inventors: Patrick Judd, Toronto (CA); Jorge Albericio, San Jose, CA (US); Alberto Delmas Lascorz, Toronto (CA); Andreas Moshovos, Toronto (CA); Sayeh Sharifymoghaddam, Toronto (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 16/314,422

(22) PCT Filed: Jun. 14, 2017

(86) PCT No.: PCT/CA2017/050731
§ 371 (c)(1),
(2) Date: Dec. 30, 2018

(87) PCT Pub. No.: WO2017/214728
PCT Pub. Date: Dec. 21, 2017

(65) Prior Publication Data
US 2019/0205740 A1 Jul. 4, 2019

Related U.S. Application Data

(60) Provisional application No. 62/349,716, filed on Jun. 14, 2016, provisional application No. 62/490,712, filed on Apr. 27, 2017.

(51) Int. Cl.
*G06N 3/063* (2006.01)
*G06N 3/04* (2006.01)
*G06N 3/08* (2006.01)

(52) U.S. Cl.
CPC ........... *G06N 3/063* (2013.01); *G06N 3/0454* (2013.01); *G06N 3/0481* (2013.01); *G06N 3/084* (2013.01)

(58) Field of Classification Search
CPC ........... G06N 3/02; G06N 3/04; G06N 3/082; G06N 3/084; G06N 3/063; G06N 3/0454; G06N 3/0481
See application file for complete search history.

(56) References Cited

U.S. PATENT DOCUMENTS

| 5,740,270 A | 4/1998 | Rutenberg et al. |
| 2011/0029471 A1 | 3/2011 | Chakradhar et al. |

(Continued)

FOREIGN PATENT DOCUMENTS

JP H08-315141 A 11/1996

OTHER PUBLICATIONS

Judd, Patrick, et al. "Reduced-precision strategies for bounded memory in deep neural nets." arXiv:1511.05236v4 (Jan. 2016): 1-12. (Year: 2016).*

(Continued)

*Primary Examiner* — Kamran Afshar
*Assistant Examiner* — Randall K. Baldwin
(74) *Attorney, Agent, or Firm* — NSIP Law

(57) ABSTRACT

Described is a system, integrated circuit and method for reducing ineffectual computations in the processing of layers in a neural network. One or more tiles perform computations where each tile receives input neurons, offsets and synapses, and where each input neuron has an associated offset. Each tile generates output neurons, and there is also an activation memory for storing neurons in communication with the tiles via a dispatcher and an encoder. The dispatcher reads neurons from the activation memory and communicates the neurons to the tiles and reads synapses from a memory and (Continued)

communicates the synapses to the tiles. The encoder receives the output neurons from the tiles, encodes them and communicates the output neurons to the activation memory. The offsets are processed by the tiles in order to perform computations only on non-zero neurons. Optionally, synapses may be similarly processed to skip ineffectual operations.

21 Claims, 22 Drawing Sheets

(56) References Cited

U.S. PATENT DOCUMENTS

| | | | | |
|---|---|---|---|---|
| 2011/0119214 | A1* | 5/2011 | Breitwisch | G06N 3/0635 706/33 |
| 2011/0119215 | A1* | 5/2011 | Elmegreen | G06N 3/0635 706/37 |
| 2011/0235914 | A1* | 9/2011 | Izhikevich | H04B 14/026 382/181 |
| 2012/0109866 | A1* | 5/2012 | Modha | G06N 3/088 706/28 |
| 2014/0114893 | A1* | 4/2014 | Arthur | G06N 3/049 706/25 |
| 2014/0258199 | A1* | 9/2014 | Modha | G06N 3/04 706/26 |
| 2015/0106314 | A1* | 4/2015 | Birdwell | G06N 3/08 706/25 |
| 2016/0162402 | A1* | 6/2016 | Woolley, Jr. | G06K 9/00288 711/202 |

OTHER PUBLICATIONS

Judd, Patrick, et al. "Proteus: Exploiting numerical precision variability in deep neural networks." Proceedings of the 2016 International Conference on Supercomputing. Jun. 1, 2016: 1-12. (Year: 2016).*

Song Han, Xingyu Liu, Huizi Mao, Jing Pu, Ardavan Pedram, Mark A. Horowitz, and William J. Dally. 2016. EIE: efficient inference engine on compressed deep neural network. In Proceedings of the 43rd International Symposium on Computer Architecture (ISCA'16). IEEE Press, Piscataway, NJ, USA, 243-254. DOI: https://doi.org/10.1109/ISCA.2016.30.

Shijin Zhang, Zidong Du, Lei Zhang, Huiying Lan, Shaoli Liu, Ling Li, Qi Guo, Tianshi Chen, and Yunji Chen. 2016. Cambricon-x: an accelerator for sparse neural networks. In The 49th Annual IEEE/ACM International Symposium on Microarchitecture (MICRO-49). IEEE Press, Piscataway, NJ, USA, Article 20, 12 pages.

Yu-Hsin Chen, Joel Emer, and Vivienne Sze. 2016. Eyeriss: a spatial architecture for energy-efficient dataflow for convolutional neural networks. In Proceedings of the 43rd International Symposium on Computer Architecture (ISCA 16). IEEE Press, Piscataway, NJ, USA, 367-379. DOI: https://doi.org/10.1109/ISCA.2016.40.

Xuda Zhou, Zidong Du, Qi Guo, Shaoli Liu, Chengsi Liu, Chao Wang, Xuehai Zhou, Ling Li, Tianshi Chen, Yunji Chen: Cambricon-S: Addressing Irregularity in Sparse Neural Networks through a Cooperative Software/Hardware Approach. 15-28, 51st Annual IEEE/ACM International Symposium on Microarchitecture, MICRO 2018, Fukuoka, Japan, Oct. 20-24, 2018. IEEE Computer Society 2018, ISBN 978-1-5386-6240-3.

Angshuman Parashar, Minsoo Rhu, Anurag Mukkara, Antonio Puglielli, Rangharajan Venkatesan, Brucek Khailany, Joel Emer, Stephen W. Keckler, and William J. Dally. 2017. SCNN: An Accelerator for Compressed-sparse Convolutional Neural Networks. SIGARCH Comput. Archit. News 45, 2 (Jun. 2017), 27-40. DOI: https://doi.org/10.1145/3140659.3080254.

Brandon Reagen, Paul Whatmough, Robert Adolf, Saketh Rama, Hyunkwang Lee, Sae Kyu Lee, José Miguel Hernández-Lobato, Gu-Yeon Wei, and David Brooks. 2016. Minerva: enabling low-power, highly-accurate deep neural network accelerators. SIGARCH Comput. Archit. News 44, 3 (Jun. 2016), 267-278. DOI: https://doi.org/10.1145/3007787.3001165.

Dongyoung Kim, Junwhan Ahn, Sungjoo Yoo: ZeNA: Zero-Aware Neural Network Accelerator. IEEE Design & Test 35 (1): 39-46 (2018).

An 11.5TOPS/W 1024-MAC Butterfly Structure Dual-Core Sparsity-Aware Neural Processing Unit in 8nm Flagship Mobile SoC Jinook Song1, Yunkyo Cho1, Jun-Seok Park1, Jun-Woo Jang2, Sehwan Lee2, Joon-Ho Song2, Jae-Gon Lee1, Inyup Kang, 2019 IEEE International Solid- State Circuits Conference.

NullHop: A Flexible Convolutional Neural Network Accelerator Based on Sparse Representations of Feature Maps, Alessandro Aimar, Hesham Mostafa, Enrico Calabrese, Antonio Rios-Navarro, Ricardo Tapiador-Morales, Iulia-Alexandra Lungu, Moritz B. Milde, Federico Corradi, Alejandro Linares-Barranco, Shih-Chii Liu, Tobi Delbruck, https://arxiv.org/abs/1706.01406.

International Search Report and Written Opinion, PCT/CA2017/050731, dated Sep. 11, 2017.

Judd et al., "Reduced-Precision Strategies for Bounded Memory in Deep Neural Nets", Jan. 8, 2016, arXiv, Web page <https://arxiv.org/abs/1511.05236>.

Korean Office Action dated Jan. 30, 2022 in corresponding Korean Patent Application No. 10-2020-7015811 (4 pages in English).

* cited by examiner

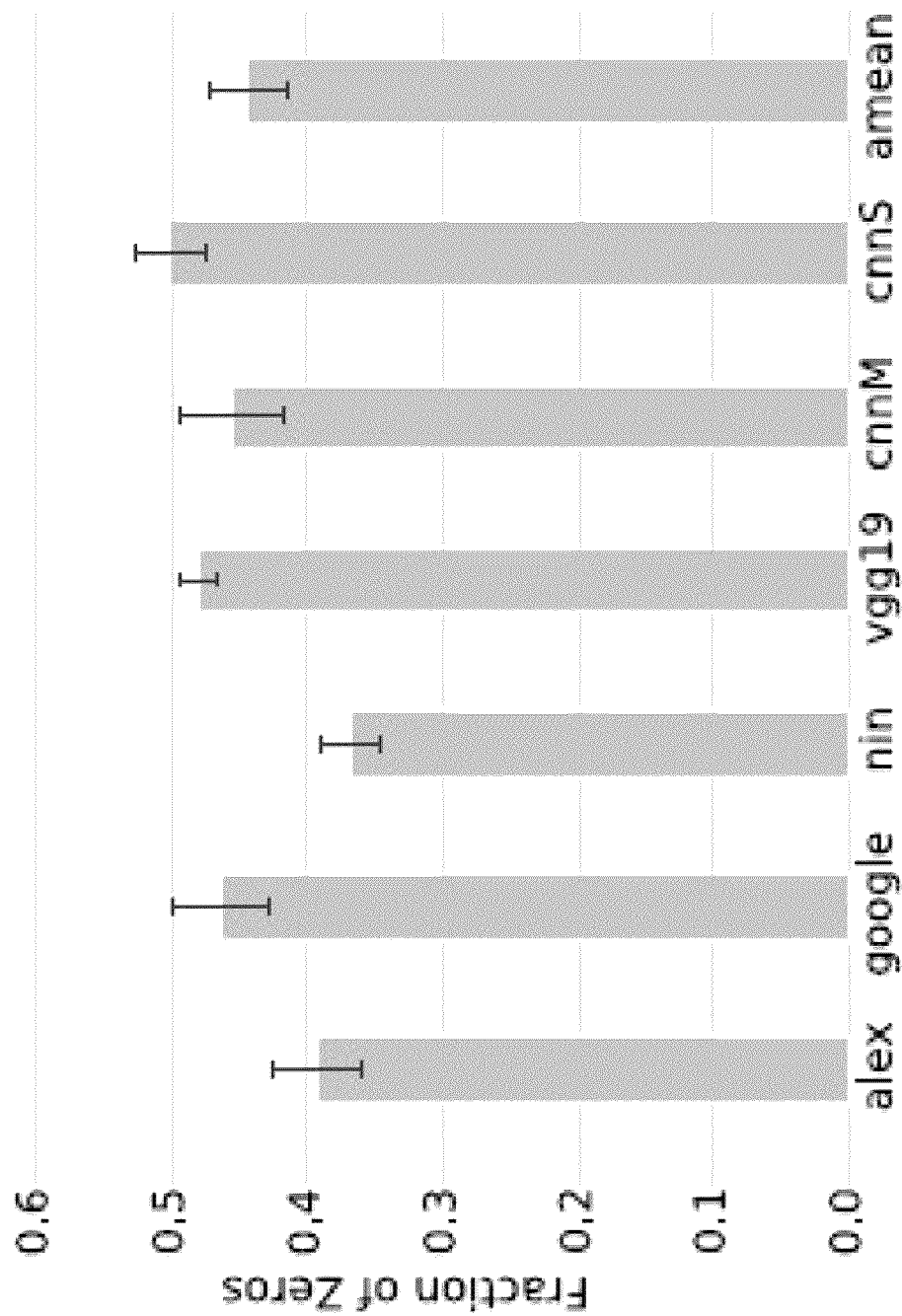
FIG. 1

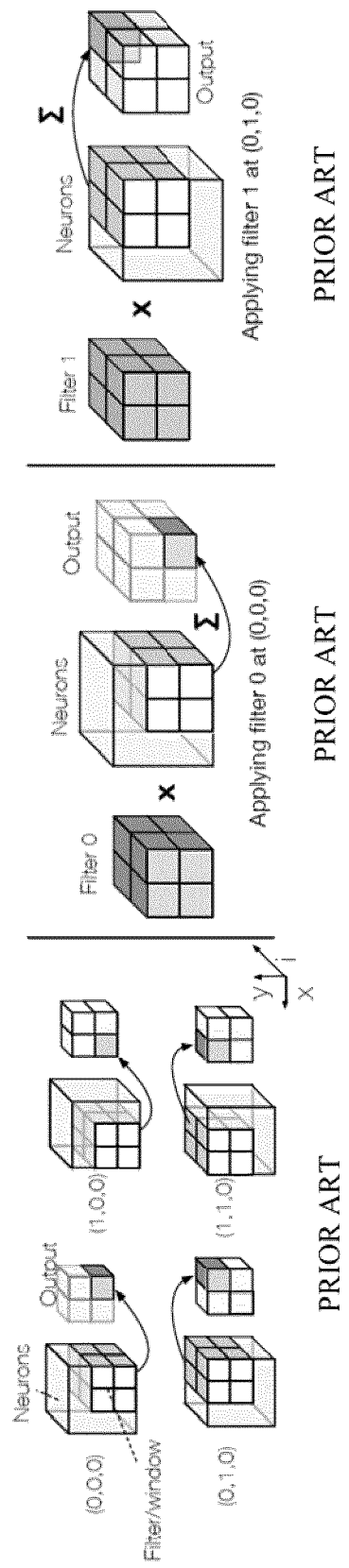

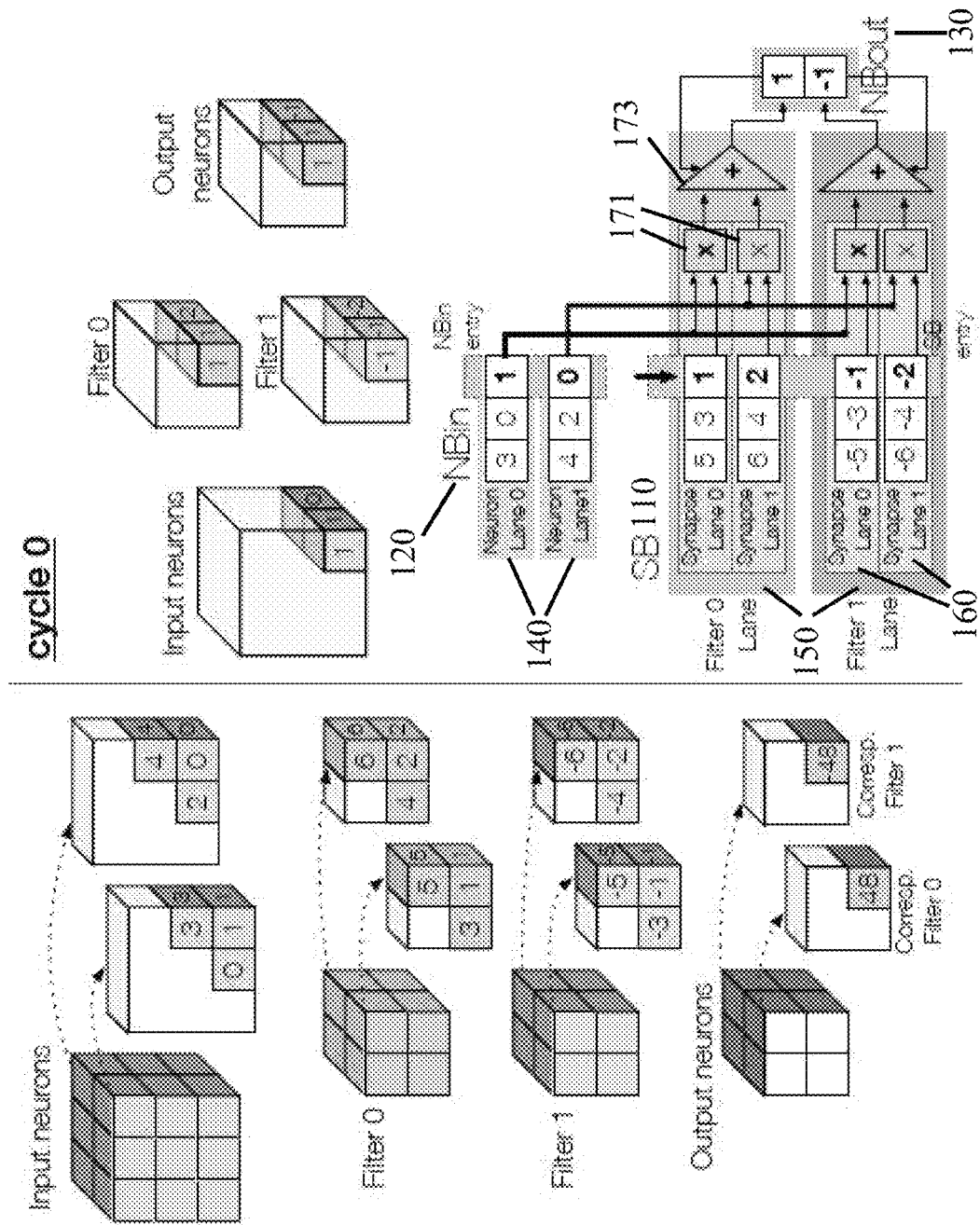
PRIOR ART
FIG. 3B
PRIOR ART
FIG. 3A

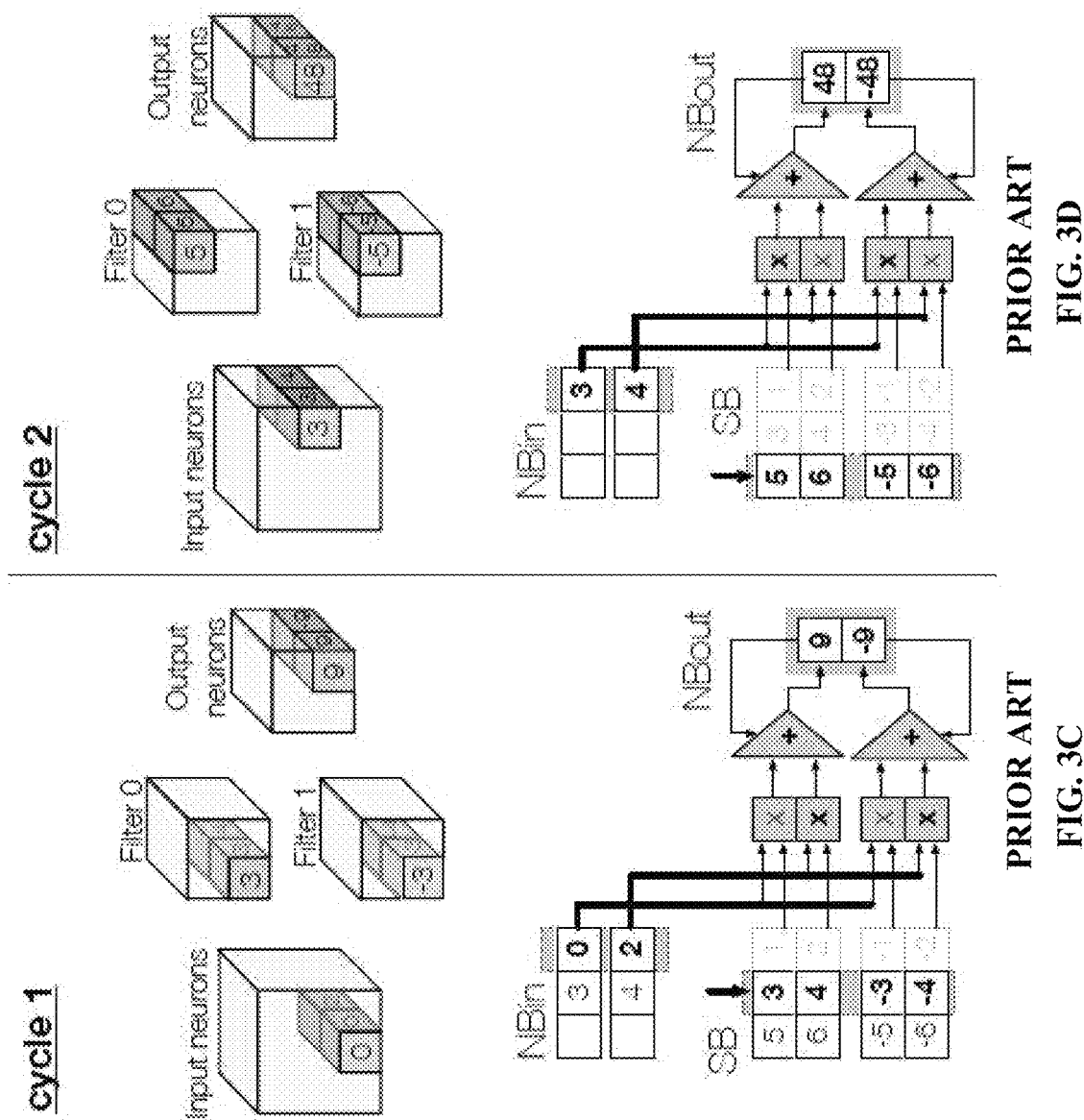

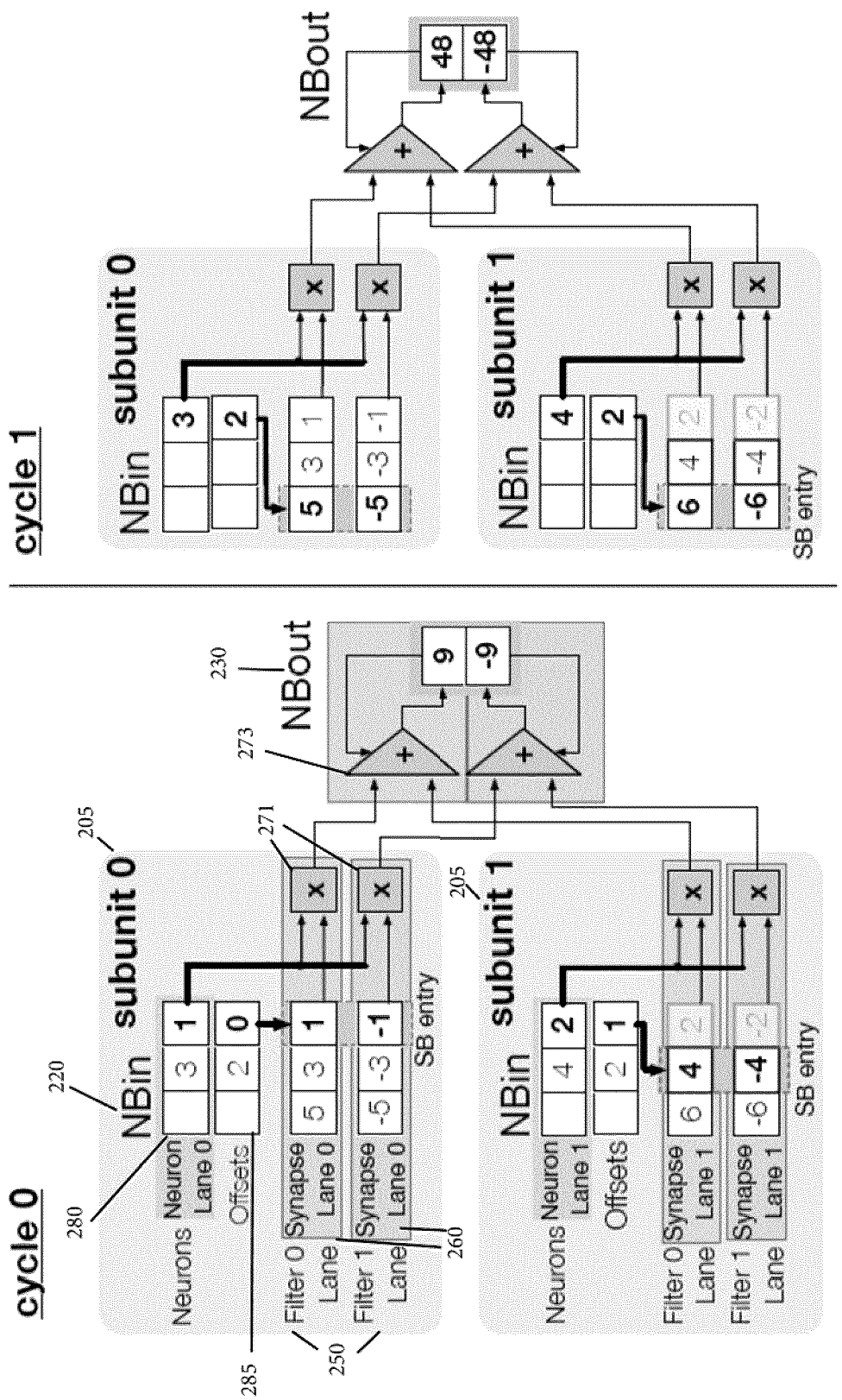
FIG. 4A
FIG. 4B

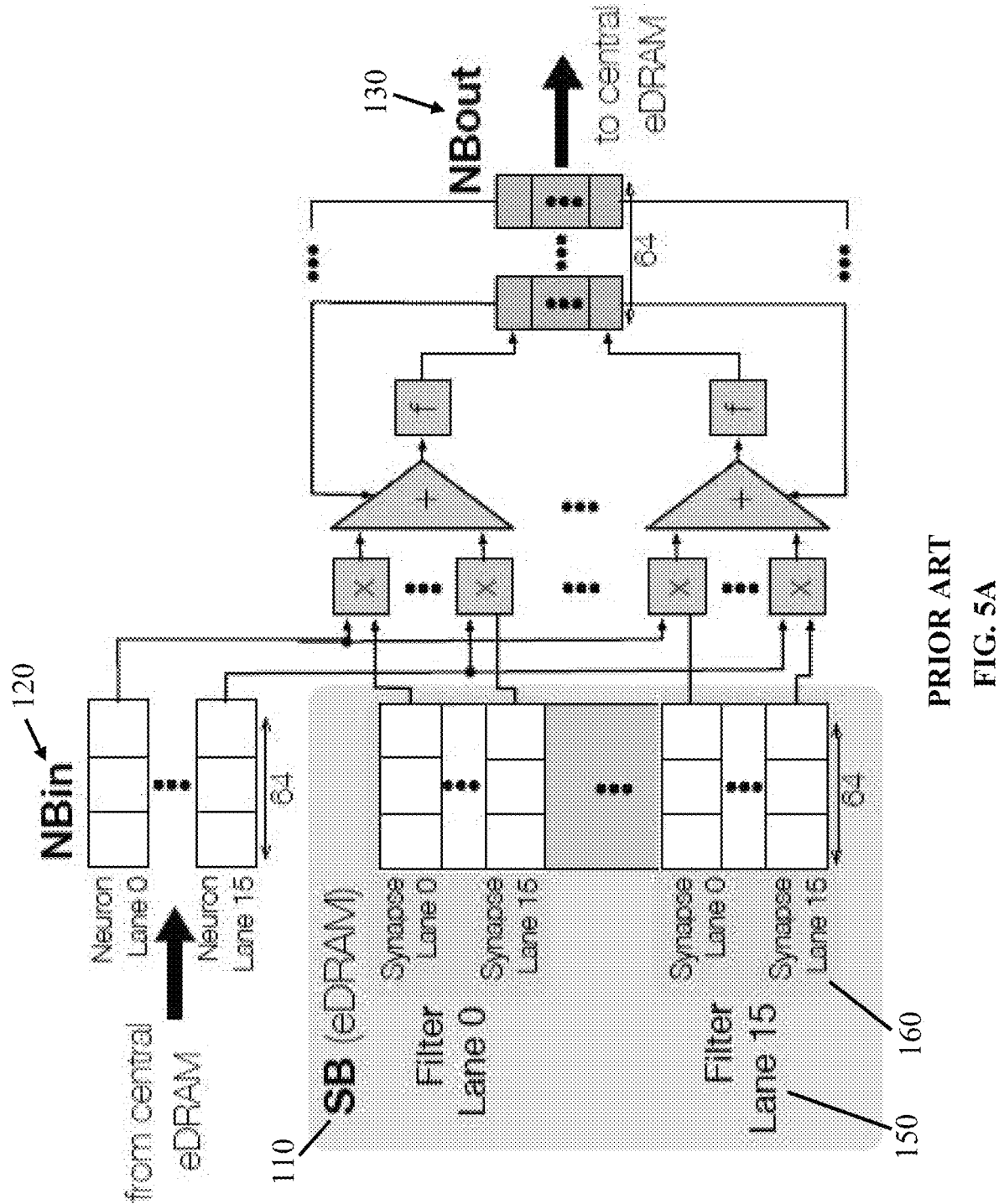
PRIOR ART
FIG. 5A

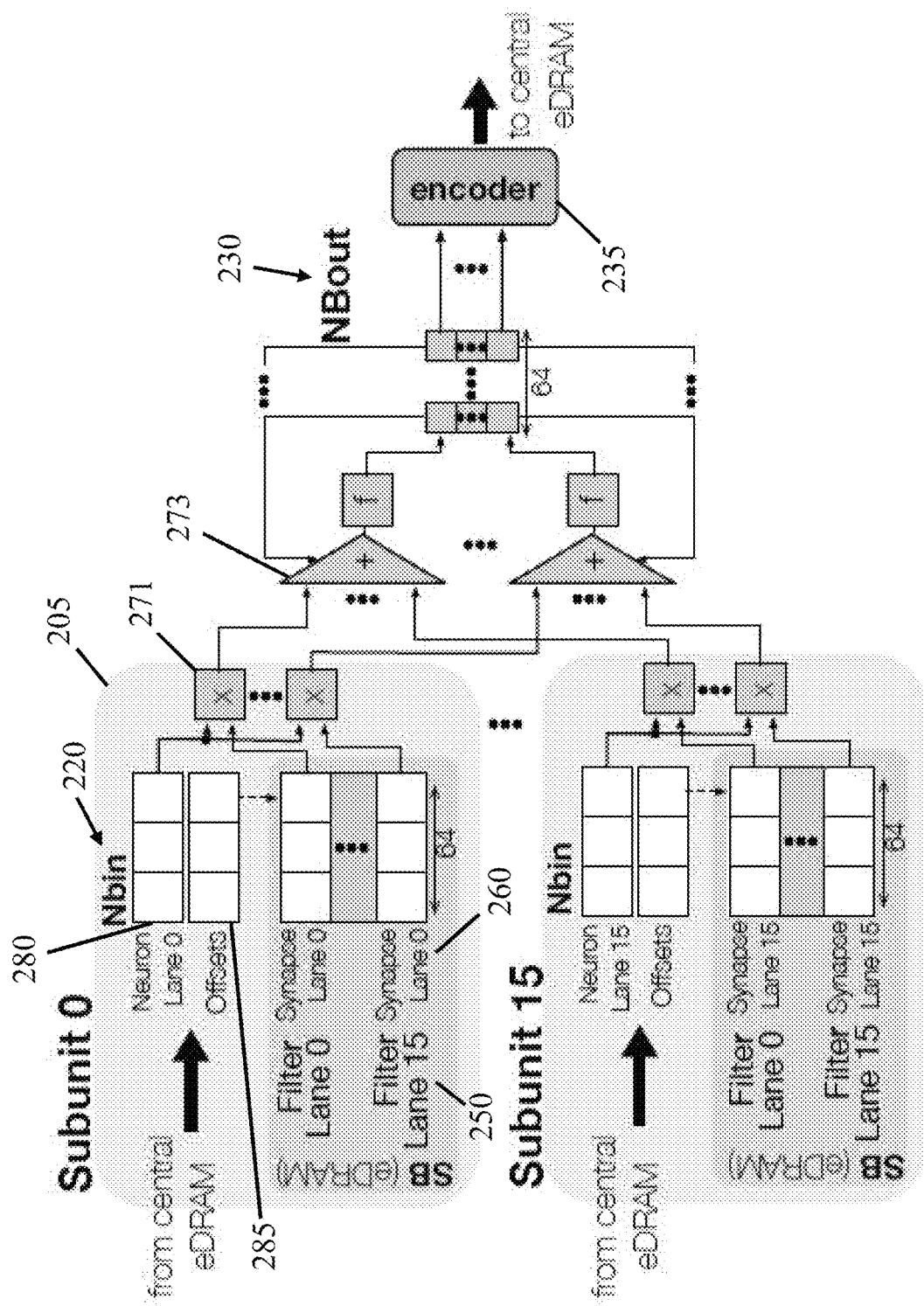
FIG. 5B

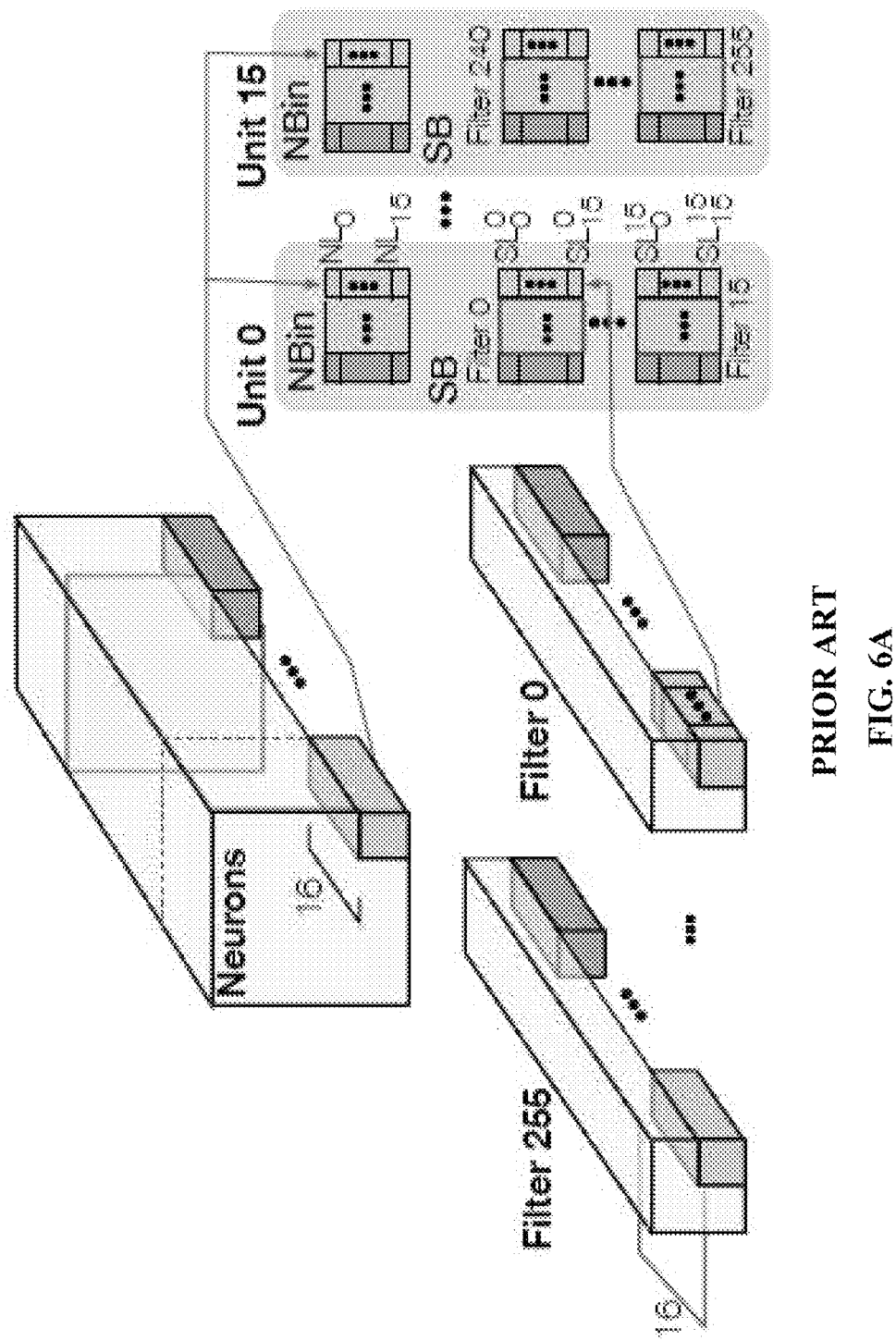
PRIOR ART
FIG. 6A

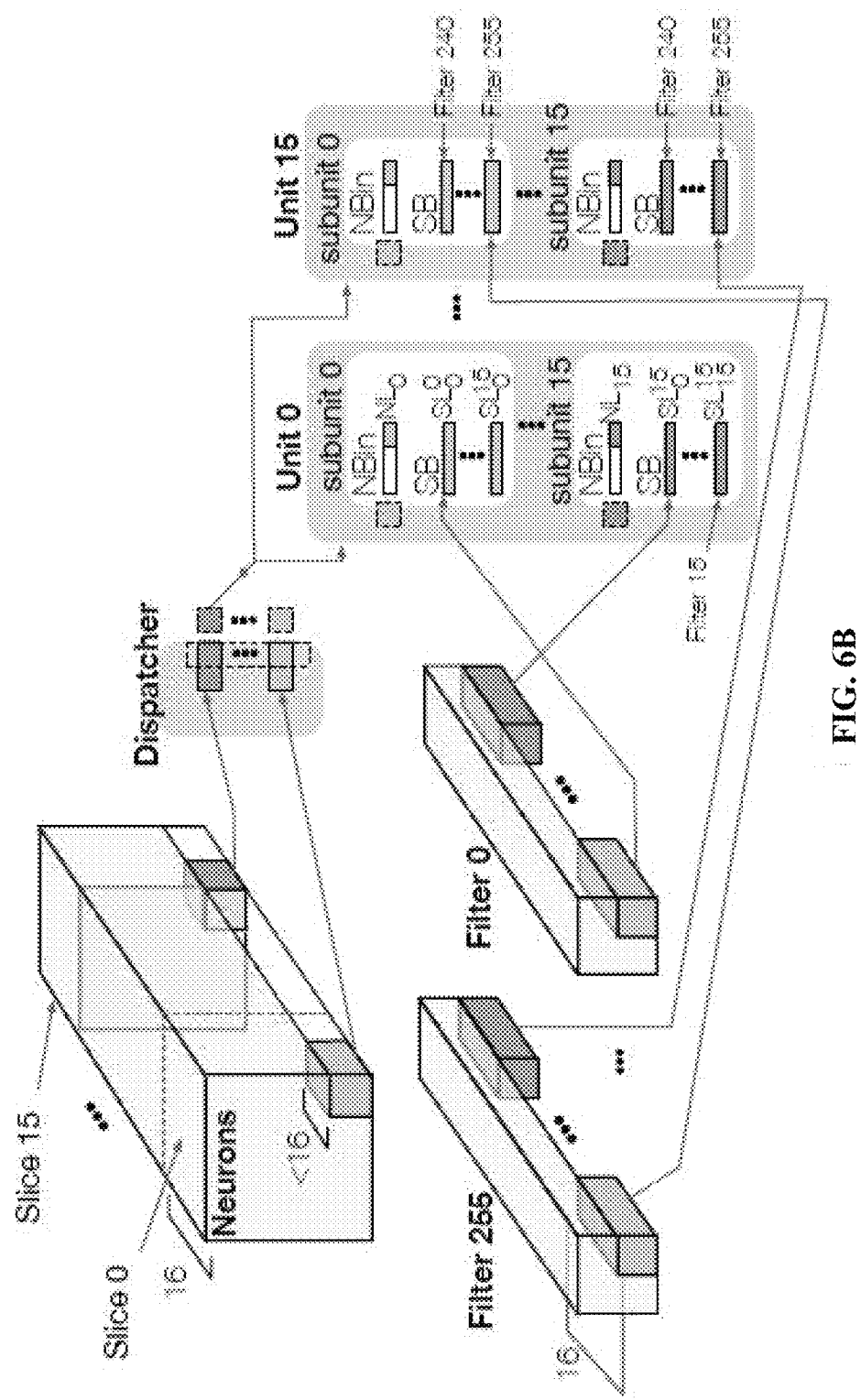
FIG. 6B

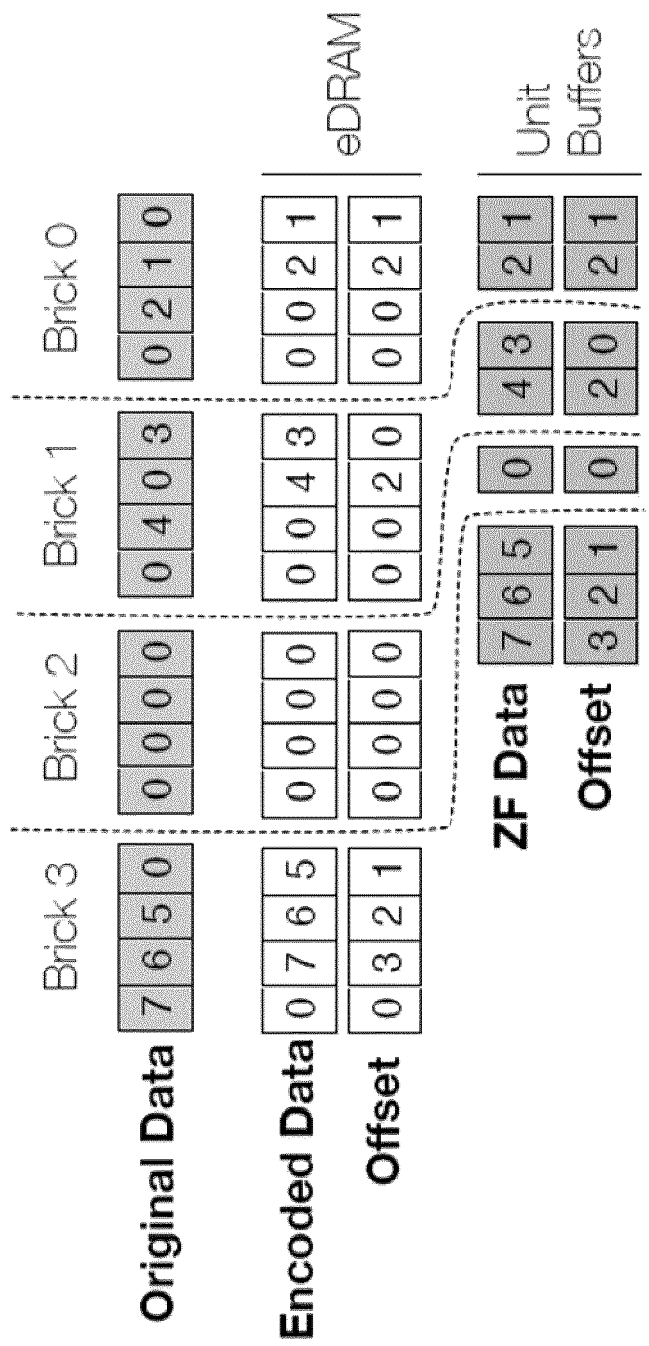
FIG. 7

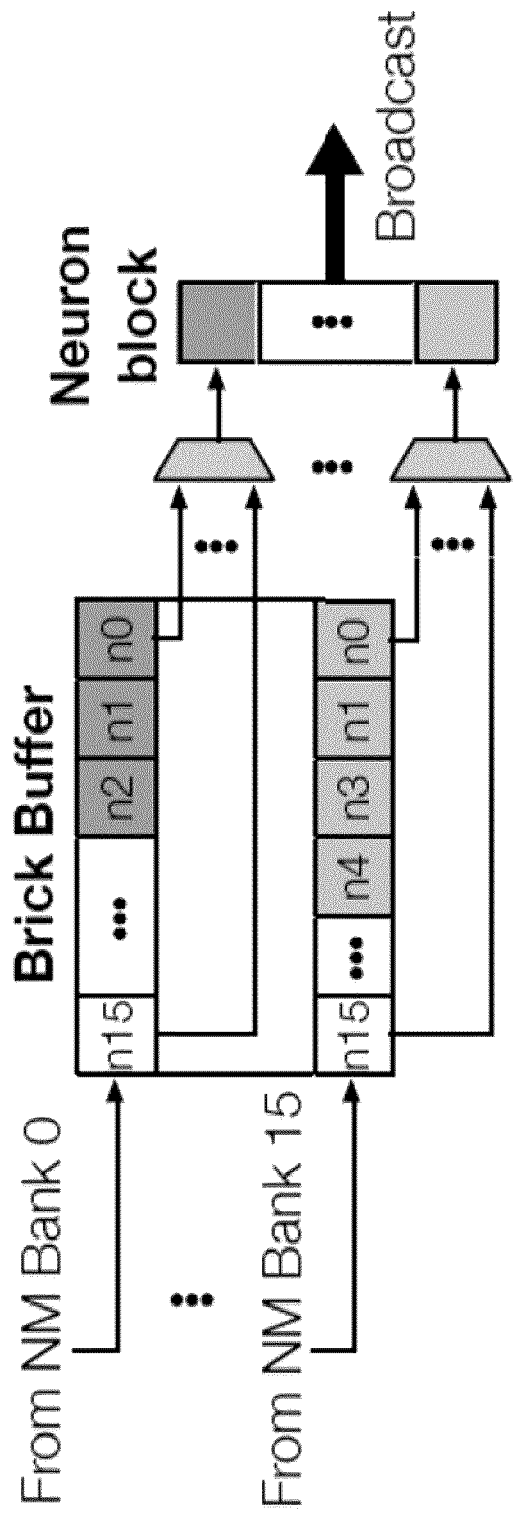
FIG. 8

| Network | Conv. Layers | Source |
|---|---|---|
| alex | 5 | Caffe: bvlc_reference_caffenet |
| | 59 | Caffe: bvlc_googlenet |
| nin | 12 | Model Zoo: NIN-imagenet |
| vgg19 | 16 | Model Zoo: VGG 19-layer |
| cnnM | 5 | Model Zoo: VGG_CNN_M_2048 |
| cnnS | 5 | Model Zoo: VGG_CNN_S |

Deep convolutional neural network (e.g., GOOGLE®)

FIG. 9

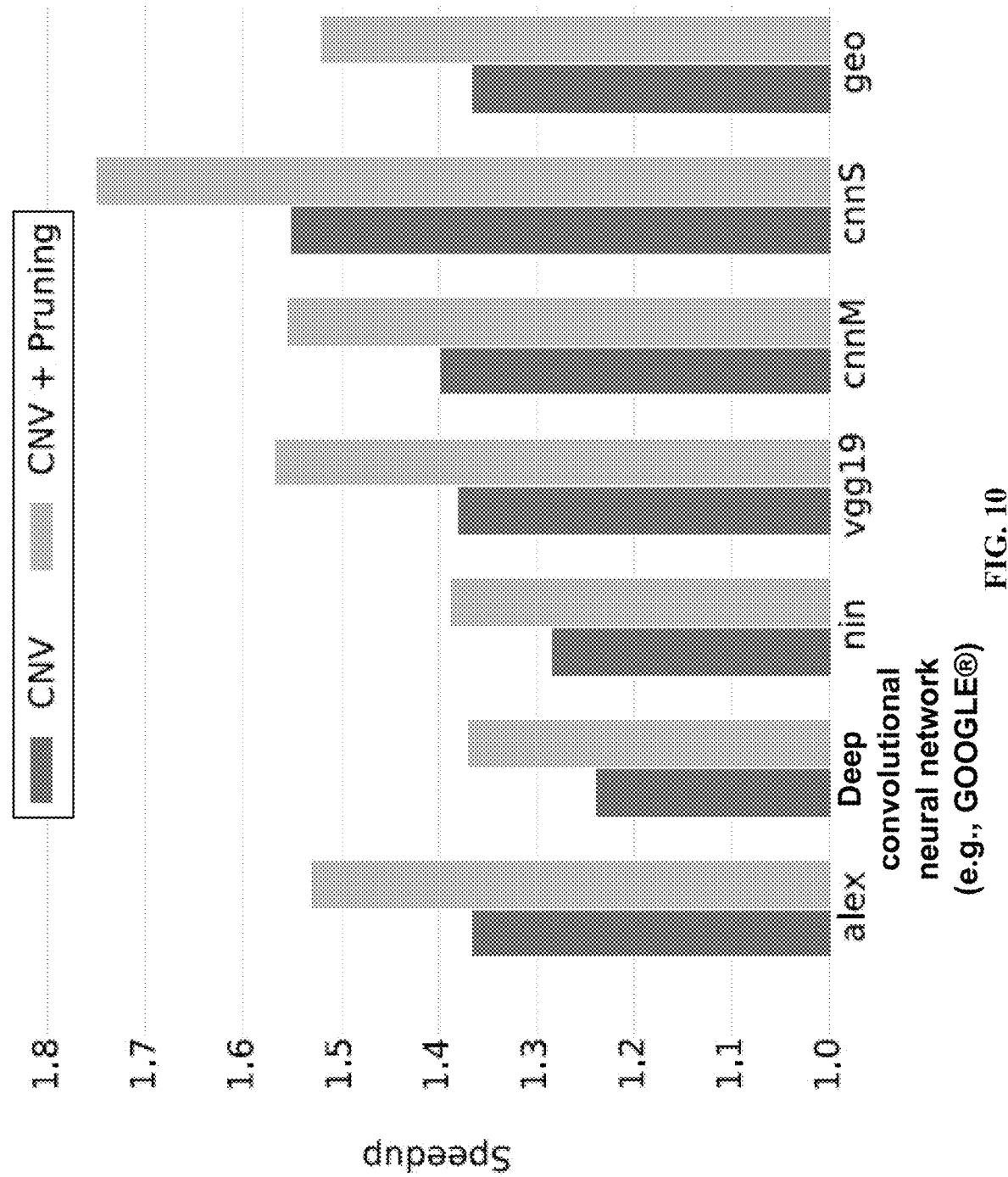
FIG. 10

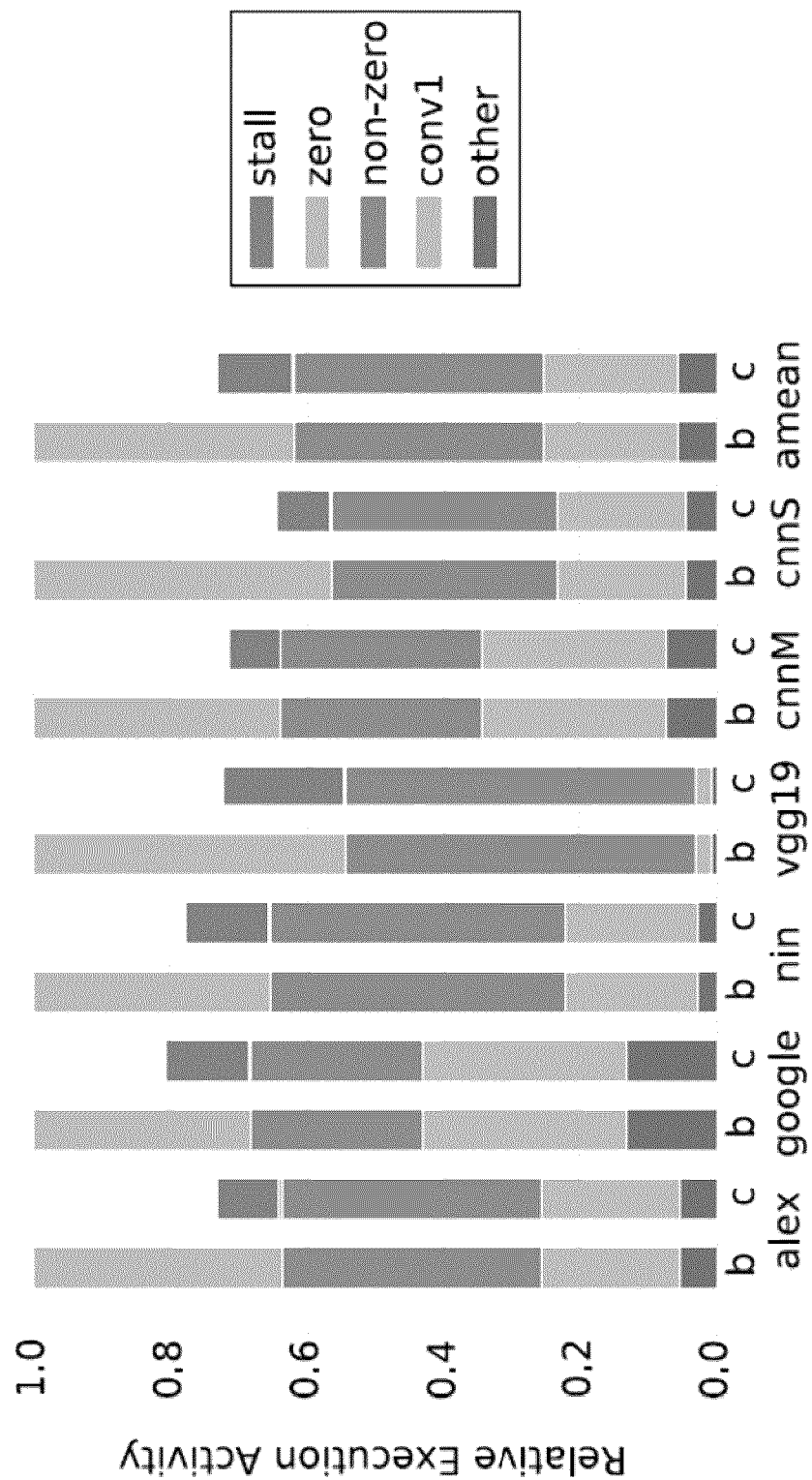
FIG. 11

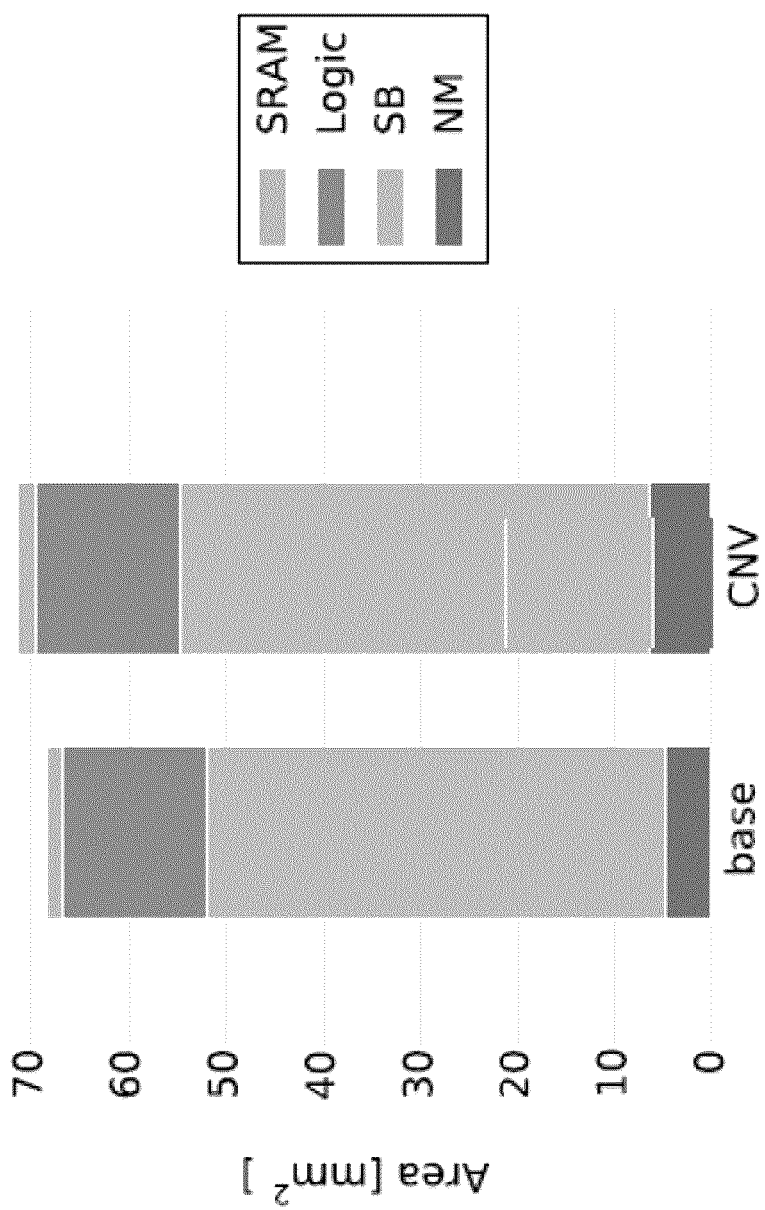
FIG. 12

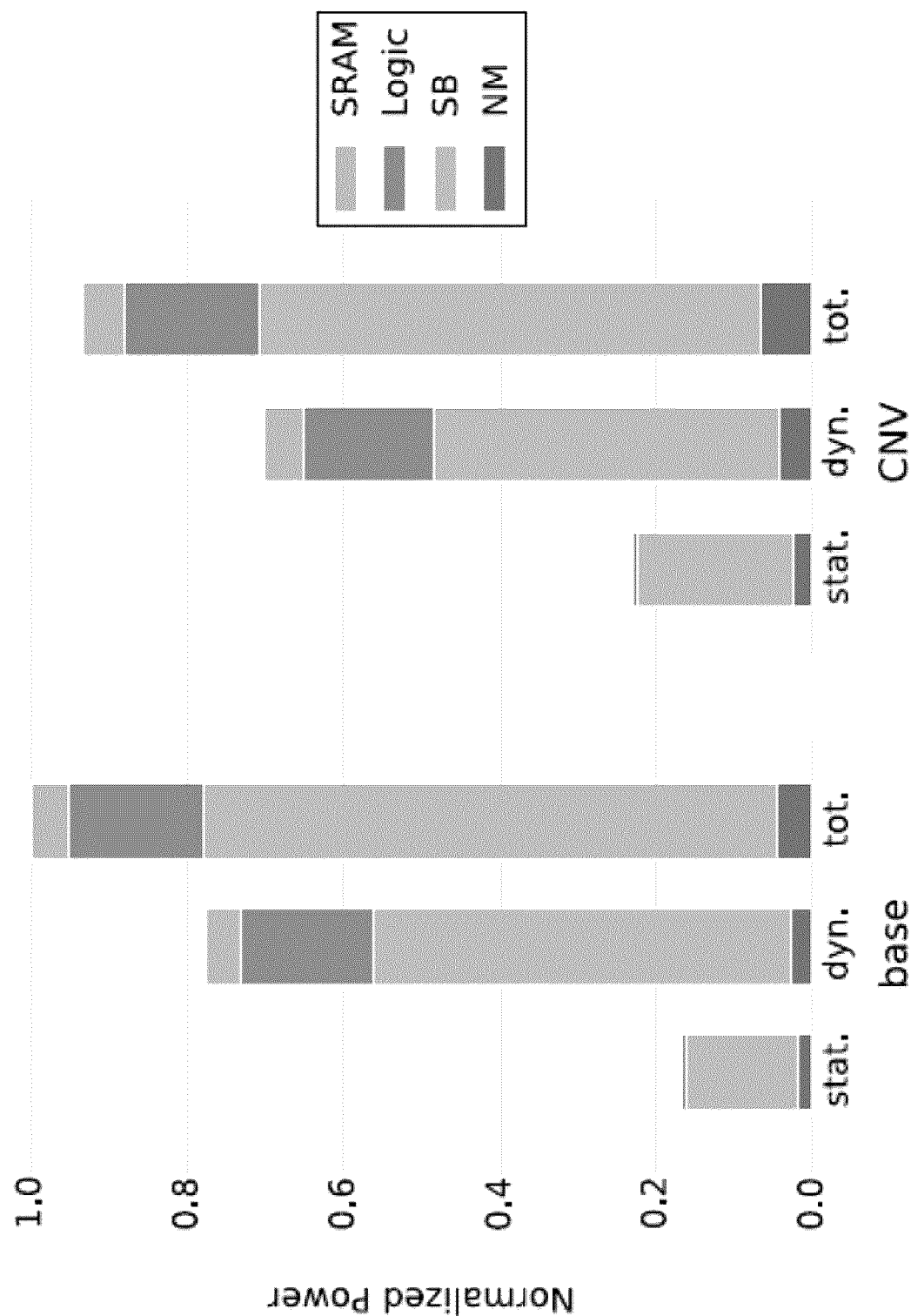
FIG. 13

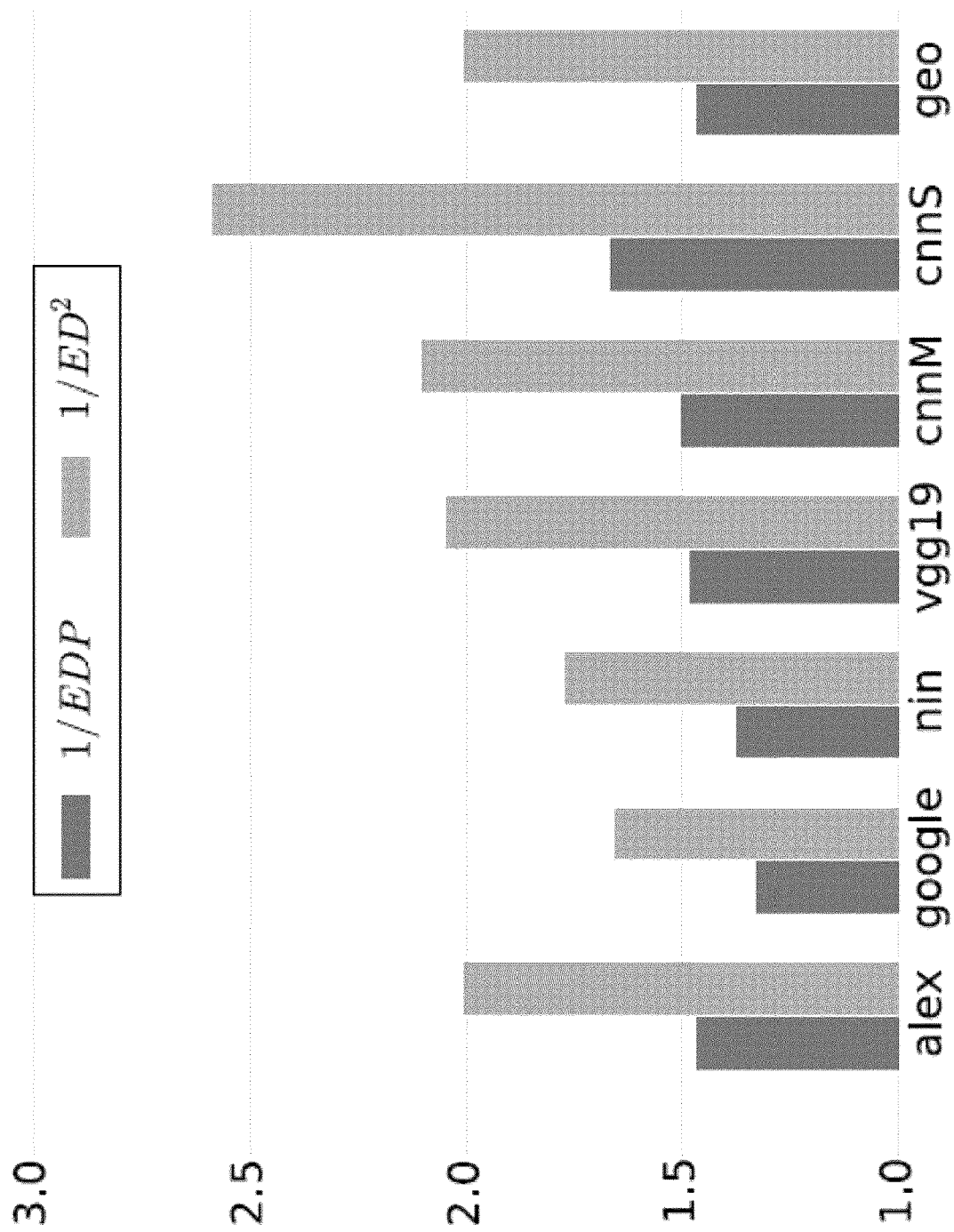
FIG. 14

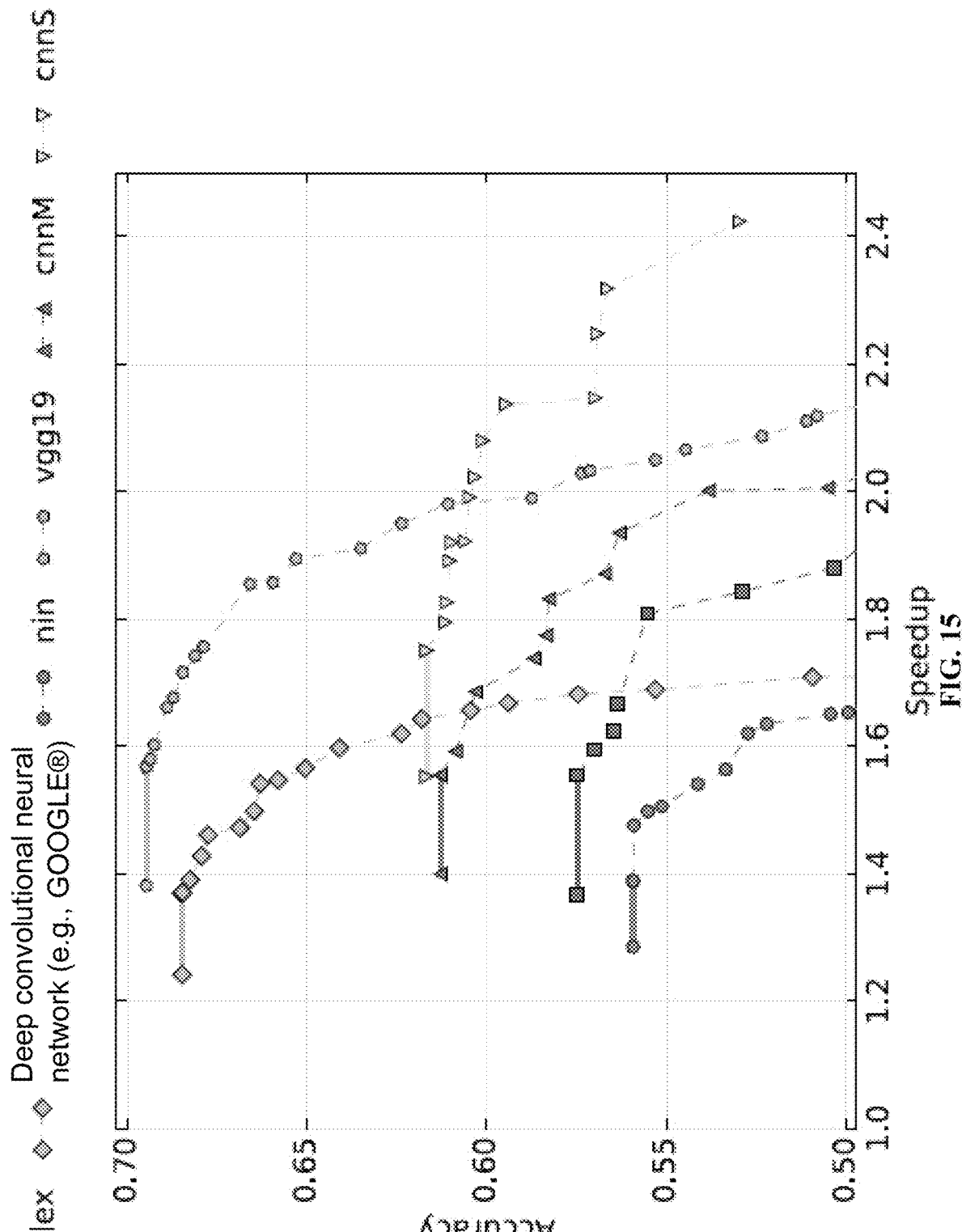
FIG. 15

| Network | Thresholds per layer | Speedup |
|---|---|---|
| alex | 8,4,8,16,8 | 1.53 |
| nin | 4,8,16,16,16,16,32,32,16,8,16,4 | 1.39 |
| | 4,4,8,16,4,4,4,4,4,2,2,2 | 1.37 |
| cnnM | 8,2,4,4,2 | 1.56 |
| cnnS | 4,4,8,4,4 | 1.75 |
| vgg19 | 8,4,16,64,64,64,64,64,128,256, 256,256,128,64,32,16,16 | 1.57 |

Deep convolutional neural network (e.g., GOOGLE®)

FIG. 16

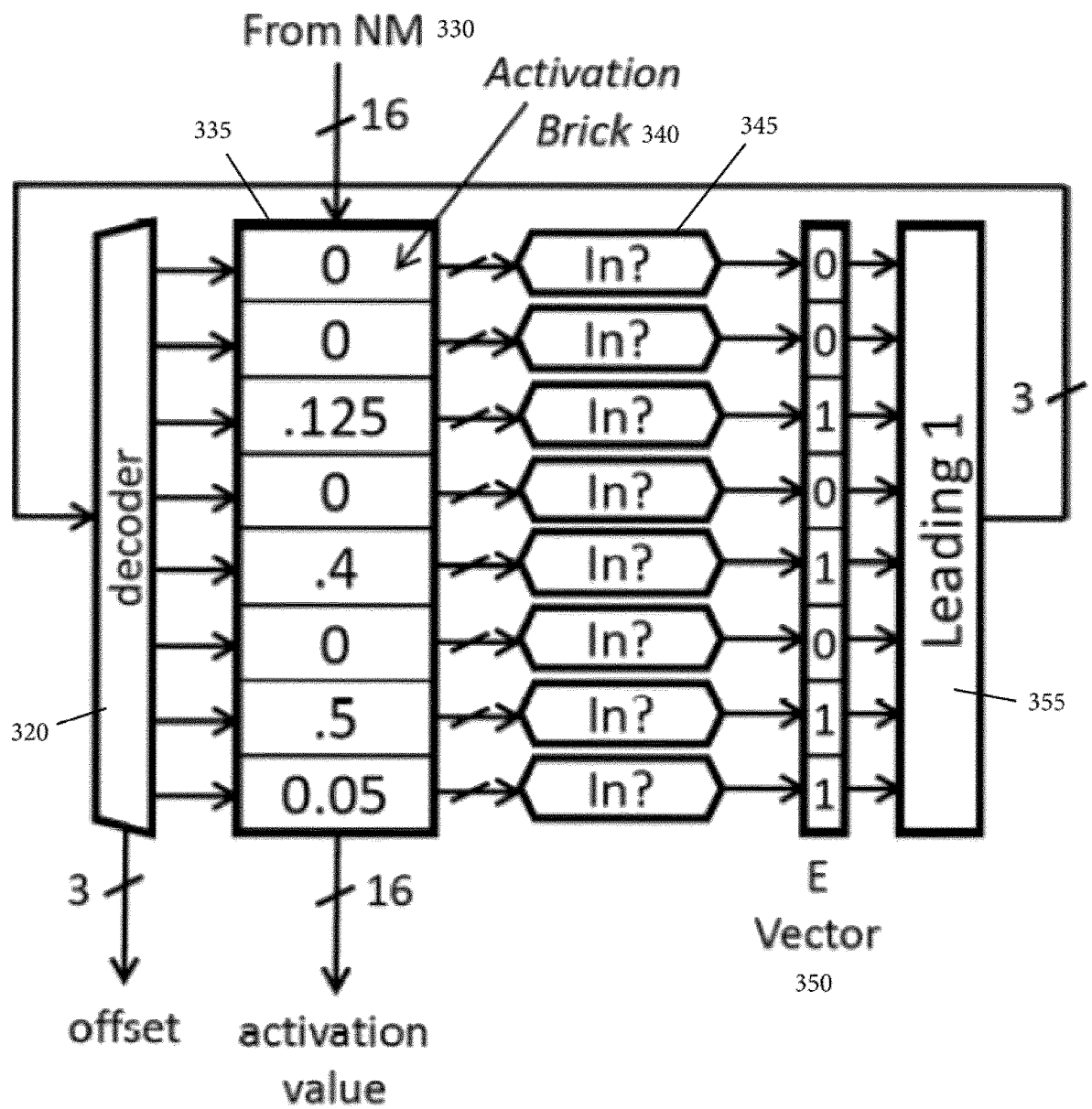
FIG. 17

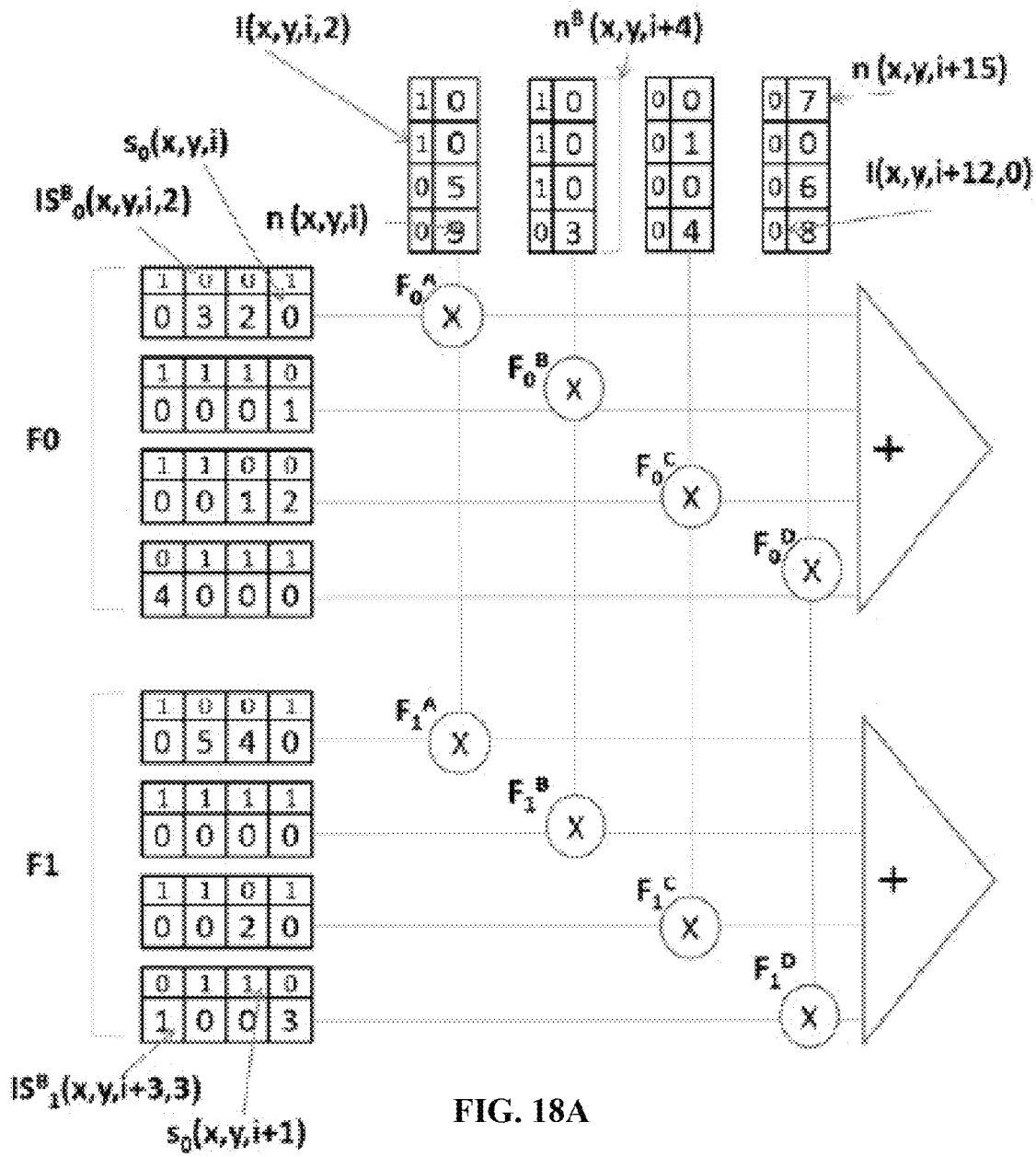
FIG. 18A $n(x,y,i)$       $s_0(x,y,i+3)$

| $F^A_0$ | $F^B_0$ | $F^C_0$ | $F^D_0$ | $F^A_1$ | $F^B_1$ | $F^C_1$ | $F^D_1$ |
|---|---|---|---|---|---|---|---|
| 9x0 | 3x1 | 4x2 | 8x0 | 9x0 | 3x0 | 4x0 | 8x3 |
| 5x2 | --- | 1x0 | 6x0 | 5x4 | --- | 1x0 | 6x0 |
| --- | --- | --- | 7x4 | --- | --- | --- | 7x1 |

FIG. 18B

| $F^A_0$ | $F^B_0$ | $F^C_0$ | $F^D_0$ | $F^A_1$ | $F^B_1$ | $F^C_1$ | $F^D_1$ |
|---|---|---|---|---|---|---|---|
| 5x2 | 3x1 | 4x2 | 8x0 | 5x4 | 3x0 | 4x0 | 8x0 |
| --- | --- | --- | 7x4 | --- | --- | --- | 7x1 |

FIG. 18C

ACCELERATOR FOR DEEP NEURAL NETWORKS

FIELD OF THE INVENTION

The present specification relates generally to neural networks, and more specifically to an accelerator for a deep neural network (DNN) that achieves performance and energy improvements by eliminating or skipping over most ineffectual operations in which an input of a multiplication is zero.

BACKGROUND OF THE INVENTION

Deep Neural Networks (DNNs) are a state-of-the-art technique in many recognition tasks such as object and speech recognition. DNNs comprise a feed-forward arrangement of layers each exhibiting high computational demands and parallelism which are commonly exploited with the use of Graphic Processing Units (GPUs). However, the high computation demands of DNNs and the need for higher energy efficiency has motivated the development and proposal of special purpose architectures. However, processing speed continues to be a limiting factor in some DNN designs, in particular for more complex applications.

Accordingly, there remains a need for improvements in the art.

SUMMARY OF THE INVENTION

In accordance with an aspect of the invention, there is provided an accelerator for a deep neural network that achieves performance and energy improvements by eliminating or skipping over most ineffectual operations in which an input of a multiplication is zero, or in some embodiments, below a threshold so as to be near zero.

According to an embodiment of the invention, there is provided a system for computation of layers in a neural network, comprising: one or more tiles for performing computations in a neural network, each tile receiving input neurons, offsets and synapses, wherein each input neuron has an associated offset, and generating output neurons; an activation memory for storing neurons and in communication with the one or more tiles via a dispatcher and an encoder, wherein the dispatcher reads neurons from the activation memory with their associated offsets and communicates the neurons with their associated offsets to the one or more tiles, and wherein the dispatcher reads synapses from a memory and communicates the synapses to the one or more tiles, and wherein the encoder receives the output neurons from the one or more tiles, encodes them and communicates the output neurons to the activation memory; and wherein the offsets are processed by the tiles in order to perform computations on only non-zero neurons.

According to a further embodiment, the present invention provides an integrated circuit comprising an accelerator for use in computing layers in a neural network, the integrated circuit comprising: one or more tiles for performing computations in a neural network, each tile receiving input neurons, offsets and synapses, wherein each input neuron has an associated offset, and generating output neurons; an activation memory for storing neurons and in communication with the one or more tiles via a dispatcher and an encoder, wherein the dispatcher reads neurons from the activation memory with their associated offsets and communicates the neurons with their associated offsets to the one or more tiles, and wherein the dispatcher reads synapses from a memory and communicates the synapses to the one or more tiles, and wherein the encoder receives the output neurons from the one or more tiles, encodes them and communicates the output neurons to the activation memory; and wherein the offsets are processed by the tiles in order to perform computations on only non-zero neurons.

According to a further embodiment, the present invention provides a method for reducing ineffectual operations in performing computations in a neural network, the method comprising: identifying non-zero neurons in a neuron stream and creating an offset value for each neuron; communicating the offset value for each neuron with the neuron to the tile which processes the neuron; the tile using the offset value to identify the non-zero neurons to perform computations on; the tile performing computations only on the non-zero neurons and generating output neurons; and storing output neurons in an activation memory.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which:

FIG. 1 is a bar graph showing the average fraction of convolutional layer multiplication input neuron values that are zero;

FIGS. 2A to 2C show steps according to the prior art of an application of a filter to an input neuron array producing an output neuron array;

FIGS. 3A to 3D show the operation of the prior art DaDianNao DNN accelerator;

FIGS. 4A and 4B show the processing of neurons in a neural functional unit according to an embodiment of the present invention;

FIG. 5A is a diagram of a DaDianNao neural functional unit (NFU) of the prior art and FIG. 5B is a diagram of a unit according to an embodiment of the present invention;

FIG. 6A is a graphic diagram showing processing order and work assignment in a DaDianNao accelerator of the prior art and FIG. 6B is a graphic diagram showing processing order and work assignment in an accelerator according to an embodiment of the present invention;

FIG. 7 is a graphic diagram showing the Zero-Free Neuron Array Format(ZFNAf) used in embodiments of the present invention;

FIG. 8 is a dispatcher according to an embodiment of the present invention;

FIG. 9 is a table of convolutional neural networks;

FIG. 10 is a bar graph showing the speedup of an embodiment of the present invention over the baseline;

FIG. 11 is a bar graph showing the breakdown of execution activity;

FIG. 12 is a bar graph showing the area breakdown of the baseline and an architecture according to an embodiment of the present invention;

FIG. 13 is a bar graph showing a breakdown of average power consumption in the baseline and according to an embodiment of the present invention;

FIG. 14 is a bar graph showing the improvement of an embodiment of the present invention over DaDianNao for energy delay product and energy delay squared product;

FIG. 15 is a chart showing the trade-off between accuracy and speedup from pruning neurons;

FIG. 16 is a table showing lossless ineffectual neuron thresholds;

FIG. 17 is a graphic diagram showing detecting and skipping ineffectual activations in the brick buffer and dispatcher, according to an embodiment; and FIGS. 18A to 18C show an example of the operation of a further embodiment of the present invention.

Like reference numerals indicate like or corresponding elements in the drawings.

DETAILED DESCRIPTION OF THE EMBODIMENTS

Deep Neural Networks (DNNs) are becoming ubiquitous thanks to their exceptional capacity to extract meaningful features from complex pieces of information such as text, images, or voice. DNNs and in particular, Convolutional Neural Networks (CNNs), offer very good recognition quality in comparison to alternative object recognition or image classification algorithms. DNNs benefit from the computing capability available in commodity computing platforms such as general-purpose graphics processors.

It is likely that future DNNs will need to be larger, deeper, process larger inputs, and be used to perform more intricate classification tasks than current DNNs, and at faster speeds, including real-time. Accordingly, there is a need to boost hardware compute capability while reducing energy per operation and to possibly do so for smaller form factor devices.

The DaDianNao accelerator, as discussed further below, seeks to improve DNN performance by taking advantage of the regular access pattern and computation structure of DNNs. It uses wide SIMD (single-instruction multiple-data) units that operate in tandem in groups of hundreds of multiplication lanes.

According to an embodiment, DNN performance may be accelerated through recognition of the content being operated upon by the DNN. In particular, a large fraction of the computations performed by Deep Neural Networks are intrinsically ineffectual as they involve a multiplication where one of the inputs is zero. On average 44% of the operations performed by the dominant computations in DNNs may fall into this category. The large proportion of ineffectual operations does not appear to vary significantly across different inputs, suggesting that ineffectual products may be the result of intrinsic properties of DNNs. Carrying out these operations where the results do not meaningfully contribute to the final result wastes a great deal of time, energy, and computing resources.

The organization of the DaDianNao accelerator does not allow neuron lanes to move independently. As a result, this type of accelerator cannot take advantage of the DNN content as it is unable to "skip over" zero-valued inputs.

As discussed in greater detail below, embodiments of the present invention provide a DNN accelerator that follows a value-based approach to dynamically eliminate most ineffectual operations. This may improve performance and energy over the DaDianNao accelerator with no loss in accuracy.

Embodiments of the invention employ hierarchical data-parallel units, allowing groups of lanes to proceed mostly independently enabling them to skip over the ineffectual computations. A co-designed data storage format stores the inputs and outputs of the relevant layers and encodes the computation elimination decisions. This takes these decisions off the critical path while avoiding control divergence in the data parallel units. The assignment of work to the data-parallel units is also modified. Combined, the units and the data storage format result in a data-parallel architecture that maintains wide, aligned accesses to its memory hierarchy and that keeps its data lanes busy most of the time independently of the distribution of zeroes in the input.

Once the capability to skip zero-operand multiplications is in place, the ineffectual operation identification criteria can be relaxed or loosened to enable further improvements with no accuracy loss. If some loss in accuracy is acceptable, even further improvements in performance and energy efficiency may be obtained by trading off accuracy with further relaxation of criteria.

Embodiments of the present invention target the convolutional layers of DNNs. In DNNs, convolutional layers dominate execution time as they perform the bulk of the computations. Convolutional layers apply several three-dimensional filters over a three-dimensional input. This is an inner product calculation that entails pairwise multiplications among the input elements, or neurons and the filter weights, or synapses. These products are then reduced into a single output neuron using addition.

In practice, many of the neuron values turn out to be zero, thus the corresponding multiplications and additions do not contribute to the final result and could be avoided. Accordingly, this section characterizes the fraction of input neurons that are equal to zero in the convolutional layers of popular DNNs that are publicly available. For these measurements, the DNNs were used to classify one thousand images from the Imagenet dataset.

FIG. 1 reports the average total fraction of multiplication operands that are neuron inputs with a value of zero across all convolutional layers and across all inputs. This fraction varies from 37% for nin, to up to 50% for cnnS and the average across all networks is 44%. The error bars show little variation across input images, and given that the sample set of 1,000 images is sizeable, the relatively large fraction of zero neurons are due to the operation of the networks and not a property of the input.

One explanation why a network produces so many zero neurons lies in the nature and structure of DNNs. At a high level, DNNs are designed so that each DNN layer attempts to determine whether and where the input contains certain learned "features" such as lines, curves or more elaborate constructs. The presence of a feature is encoded as a positive valued neuron output and the absence as a zero-valued neuron. Accordingly, when features exist, most likely they will not appear all over the input. Moreover, not all features will exist. DNNs detect the presence of features using the convolutional layers to produce an output encoding the likelihood that a feature exists at a particular position with a number. Negative values suggest that a feature is not present. Convolutional layers may be followed by a Rectifier, or ReLU layer which lets positive values pass through, but converts any negative input to zero.

While there are many zero-valued neurons, their position depends on the input data values, and hence it will be challenging for a static approach to eliminate the corresponding computations. In particular, there were no neurons that were always zero across all inputs. Even if it was possible to eliminate neurons that were zero with high probability, there would not be many. For example, only 0.6% of neurons are zero with 99% probability. The architecture described further below detects and eliminates such computations at runtime.

Since the time needed to compute a convolutional layer increases mostly linearly with the number of elements processed and since convolutional layers dominate execution time, these measurements may indicate an upper bound on the potential performance improvement for an architecture that manages to skip the computations corresponding to zero-valued neurons.

Having shown that many of the neurons are zero, embodiments of present invention may skip over the corresponding computations by: 1) lane decoupling, and 2) storing the input on-the-fly in an appropriate format that facilitates the elimination of zero valued inputs.

Computation of Convolutional Layers

The operations involved in computing a CNN are of the same nature as in a DNN. The main difference is that in the former, weights are repeated so as to look for a feature at different points in an input (i.e. an image). The input to a convolutional layer is a 3D array of real numbers of dimensions $I_x \times I_y \times i$. These numbers are the input data in the first layer and the outputs of the neurons of the previous layer for subsequent layers. In the remainder of this work, they may be designated "input neurons". Each layer applies N filters at multiple positions along x and y dimensions of the layer input. Each filter is a 3D array of dimensions $F_x \times F_y \times i$ containing synapses. All filters are of equal dimensions and their depth is the same as the input neuron arrays. The layer produces a 3D output neuron array of dimensions $O_x \times O_y \times N$. The output's depth is the same as the number of the filters.

To calculate an output neuron, one filter is applied over a window, or a subarray of the input neuron array that has the same dimensions as the filters $F_x \times F_y \times i$. Let $n(x, y, z)$ and $o(x, y, z)$ be respectively input and output neurons, and $s^f(x, y, z)$ be synapses of filter f. The output neuron at position (k, l, f), before the activation function, is calculated as follows:

$$\underbrace{o(k, l, F)}_{\text{output neuron}} = \underbrace{\sum_{y=0}^{F_y-1} \sum_{x=0}^{F_x-1} \sum_{i=0}^{I-1} \underbrace{s^F(y, x, i)}_{\text{synapse}} \times \underbrace{n(y + l \times S, x + k \times S, i)}_{\text{input neuron}}}_{\text{window}}.$$

There is one output neuron per window and filter. The filters are applied repeatedly over different windows moving along the X and Y dimensions using a constant stride S to produce all the output neurons. Accordingly, the output neuron array dimensions are $O_x=(I_x-F_x)/S+1$, and $O_y=(I_y-F_y)/S+1$. FIG. 2 shows an example with a 3×3×2 input neuron array, a single 2×2×2 filter and unit stride producing an output neuron array of 2×2×1.

When an input neuron is zero the corresponding multiplication and addition can be eliminated to save time and energy without altering the output value.

As shown in FIG. 2A, the output neuron at position (0, 0, 0) or o(0, 0, 0) is produced by applying the filter on a 2×2×2 window of the input with origin n(0, 0, 0). Each synapse s(x, y, z) is multiplied by the corresponding input neuron n(x, y, z), e.g., n(0, 0, 0)×s(0, 0, 0), and n(0, 1, 0)×s(0, 1, 0), for a total of 2×2×2 or eight products. The eight products are reduced into a single output neuron using addition. Then the window is slide over by S first along the X dimension to produce o(1, 0, 0) using the neuron input window at origin n(1, 0, 0). For example, now s(0, 0, 0) is multiplied with n(1, 0, 0) and s(1, 1, 0) with n(2, 1, 0).

Once the first dimension is exhausted, then the window slides by S along the Y dimension and starts scanning along the X dimension again, and so on as the figure shows. In total, the result is a 2×2×1 output neuron. The depth is one since there is only one filter.

FIGS. 2B and 2C show a convolutional layer with two 2×2×2 filters. The output now is a 2×2×2 array, with each filter producing one of the two planes or layers of the output. As FIG. 2B shows, the first filter produces output elements o(x, y, 0). FIG. 2C shows that the second filter produces output neurons o(x, y, 1).

The Simplified Baseline Architecture (DaDianNao)

The baseline architecture is based on the DaDianNao state-of-the-art accelerator proposed by Chen et al. This section explains via an example how a simplified unit of this architecture calculates a convolutional layer and why, as it stands, it cannot skip over zero valued input neurons.

The operation of the DaDianNao accelerator is shown in FIG. 3. In FIG. 3(a) a 3×3×2 neuron array is convolved with unit stride by two 2×2×2 filters producing a 2×2×2 output neuron array. In FIG. 3(b) the example unit comprises: 1) two neuron lanes 140, and 2) two filter lanes 150 each containing two synapse sublanes 160. Each neuron lane 140 and synapse sublane is fed respectively with a single element from an Input Neuron Buffer (NBin) 120 lane and a Synapse Buffer (SB) 110 lane. Every cycle, each neuron lane 140 broadcasts its neuron to the two corresponding synapse sublanes 160 resulting into four pairs of neurons and synapses, one per synapse sublane. A multiplier 171 per synapse sublane multiplies the neuron and synapse inputs. An adder tree 173 per filter lane reduces two products into a partial sum that accumulates into an Output Neuron Buffer (NBout) 130 lane per filter.

Taking advantage of the structure of the layer computations, the unit couples all neuron and filter lanes so that they proceed in lock-step. This is adequate if one considers only the structure of the computation assuming that most if not all computations ought to be performed. However, as is, this unit cannot skip over zero neurons. In this example, the zeros in both neuron lanes are unfortunately coupled with non-zero neurons. There are four multiplications that could be safely avoided potentially improving performance and energy.

In the example of FIG. 3, the calculation of the complete filter would take one additional cycle, only the first three cycles are shown here. The elements of both filters have the same values with opposite signs only for the sake of clarity. In FIG. 3A there is a partial set of input neurons and synapses. FIGS. 3B to 3D show three cycles of processing. The top part shows which neurons and synapses are being processed, and the bottom part is unit processing.

In FIG. 3B, cycle 0, the first two neurons from NBin (1 and 0), are multiplied with the respective synapses of the two filters, ((1,2) and (−1,−2)), each product pair per filter is reduced through the adder and stored in NBout (1 and −1). The SB pointer advances by one and the neuron is discarded from NBin.

In FIGS. 3C and 3D, cycles 1 and 2, the same sequence of actions is shown for the next input neuron and filter synapse pairs. The NBout partial sums are read and used as extra inputs to the adder tree making progress toward calculating the final output neurons.

Baseline Architecture

While the above described a simplified version of the DaDianNao baseline unit which processed two input neurons and two synapses of two filters at a time, each DaDianNao chip, or node, contains 16 Neural Functional Units (NFUs), or simply units. FIG. 5A shows one such unit. Each cycle the unit processes 16 input activations or neurons, 256 weights or synapses from 16 filters, and produces 16 partial output activations or neurons. In detail, the unit has 16 neuron lanes, 16 filter lanes 150 each with 16 synapse lanes 160 (256 in total), and produces 16 partial sums for 16 output neurons. The unit's SB 110 has 256 lanes (16×16) feeding the 256 synapse lanes, NBin 120 has 16 lanes feeding the 16 neuron lanes, and NBout 130 has 16 lanes. Each neuron lane is connected to 16 synapse lanes 160, one from each of the 16 filter lanes 150. The unit has 256 multipliers and 16 17-input adder trees (16 products plus the partial sum from NBout). The number of neuron lanes and filters per unit are design time parameters that could be changed. All lanes operate in lock-step.

DaDianNao is designed with the intention to minimize off-chip bandwidth and to maximize on-chip compute utilization. The total per cycle synapse bandwidth required by all 16 units of a node is 4K synapses per cycle, or 8 TB/sec assuming a 1 GHz clock and 16-bit synapses. The total SB 110 capacity is designed to be sufficient to store all synapses for the layer being processed (32 MB or 2 MB per unit) thus avoiding fetching synapses from off-chip. Up to 256 filters can be processed in parallel, 16 per unit. All inter-layer neuron outputs except for the initial input and final output are also stored in an appropriately sized central eDRAM, or Neuron Memory (NM). NM is shared among all 16 units and is 4 MB for the original design. The only traffic seen externally is for the initial input, for loading the synapses once per layer, and for writing the final output.

Processing starts by reading from external memory: 1) the filter synapses, and 2) the initial input. The filter synapses are distributed accordingly to the SBs whereas the neuron input is fed to the NBins. The layer outputs are stored through NBout to NM and then fed to the NBins for processing the next layer. Loading the next set of synapses from external memory can be overlapped with the processing of the current layer as necessary. Multiple nodes can be used to process larger DNNs that do not fit in the NM and SBs available in a single node. NM and the SBs are implemented using eDRAM as the higher the capacity the larger the neurons and filters that can be processed by a single chip without forcing external memory spilling and excessive off-chip accesses.

FIG. 6(a) shows how the DaDianNao architecture processes an input neuron array applying 256 filters simultaneously. Each unit processes 16 filters, with unit 0 processing filters 0 through 15 and unit 15 processing filters 240 through 255. For simplicity, the figure only shows the position of the elements on the i dimension (for example, the position (0, 0, 15) of filter 7 would be shown as $s^7$ s). Every cycle, a fetch block of 16 input neurons (each 16-bits long) is fed to all 16 units. The fetch block contains one neuron per synapse lane for each of the 16 filter lanes per unit. For example, in cycle 0, the fetch block will contain neurons n(0, 0, 0) through n(0, 0, 15). Neuron n(0, 0, 0) will be multiplied in unit 0 with synapses $s^0(0, 0, 0)$ through $s^{15}(0, 0, 0)$, and with synapses $s^{240}(0, 0, 0)$ though $s^{255}(0, 0, 0)$ in unit 15. Neuron n(0, 0, 1) is multiplied with synapses $s^0(0, 0, 1)$ though $s^{15}(0, 0, 1)$ in unit 0, and so on. The synapses are stored in the SBs in the order shown in the figure, so that the units can fetch the appropriate synapses in parallel. For example, the first entry (column) of SB in Unit 0 contains the following 256 synapses: $s^0(0, 0, 0)$-$s^0(0, 0, 15)$, . . . , $s^{15}(0, 0, 0)$-$s^{15}(0, 0, 15)$.

Once the current window has been processed, the next window can be initiated since the location where the corresponding neurons start can be directly calculated given their coordinates. Since the window has to be processed by all filters, other work assignments are possible. The assignment chosen interleaves the input across lanes at a neuron level as it can also be seen on the figure. Since no attempt is made to skip over zeroes, a single 16-neuron wide fetch from NM can provide work for all lanes across all units achieving 100% utilization.

To recap, DaDN processes all activations regardless of their values. DaDN is a massively data-parallel architecture. Every cycle, it processes 16 activation values, and weights from up to 256 filters. Specifically, for each filter, DaDN multiplies the 16 activation values with 16 weights and accumulates the result into a partial output activation. This process repeats until all activation values necessary have been processed for each desired output activation.

A Simplified Architecture According to Embodiments of the Present Invention

To exploit the significant fraction of zeroes in the neuron stream, the prior art structure in which all neuron lanes are coupled together is changed. The embodiment of the present invention decouples the neuron lanes allowing them to proceed independently. FIG. 4 shows the equivalent simplified design of an embodiment of the present invention and how it proceeds over two cycles. The DaDianNao units are now split into 1) the back-end containing the adder trees and NBout 230, and 2) the front-end containing the neuron lanes 280, synapse sublanes 260, and multipliers. While the back-end remains unchanged, the front-end is now split into two subunits 205 one per neuron lane 280. Each subunit 205 contains one neuron lane 280 and a synapse sublane 260 from each of the two filters 250. Each cycle each subunit generates two products at multipliers 271, one per filter. The products are fed into the two adder trees 273 as before producing the partial output neuron sums. With this organization, the neuron lanes 280 are now capable of proceeding independently from one another and thus have the potential to skip over zeroes.

Instead of having the neuron lanes 280 actively skip over zero neurons as they appear in the input, according to an embodiment of the present invention, a dynamic hardware approach may be used where the zero neurons are eliminated at the output of the preceding layer. As a result, only the non-zero neurons appear in the NBin 220. For this purpose, the input neuron array is stored in the Zero-Free Neuron Array format (ZFNAf), as described further below. Here we present a simplified version of this format explaining how it allows individual neuron lanes to see only the non-zero neurons proceeding independently from the other neuron lanes. Once the zero neurons are eliminated, each non-zero neuron is matched with the appropriate SB entry. ZFNAf augments each non-zero input neuron with an offset for this purpose. For example, if the original stream of neurons would have been (1, 0, 0, 3) they will be encoded as ((1, 0), (3, 3)). The offsets 285 can adjust the SB sublane's index so that it can access the appropriate synapse column. According to embodiments of the present invention, the ZFNAf may be generated on-the-fly.

In FIG. 4, the simplified unit according to an embodiment of the present invention produces the same output as the prior art unit of FIG. 3 in just two cycles. The elements of both filters have the same values with opposite signs only for the sake of clarity.

In FIG. 4A, Cycle 0, subunit 0 reads the next NB neuron value 1 and its offset 0. Using the offset, it indexes the appropriate SB synapses 1 and −1 corresponding to filter 0 and 1. The resulting products 1 and −1 are added to output neurons for the corresponding filters using the dedicated adder trees. Similarly, subunit 1 will fetch neuron 2 with offset 1 and multiply with synapses 4 and −4 feeding the corresponding adder trees for the filters.

In FIG. 4B, Cycle 1, the operation repeats as before with subunit 0 fetching neuron 3 at offset 2 and subunit 1 fetching neuron 4 at offset 2. The same result as in the baseline (48, −48) is calculated in only two cycles.

Architecture According to an Embodiment of the Present Invention

FIG. 5B shows a unit according to an embodiment which may offers the same computation bandwidth as a DaDianNao unit. The front-end comprising the neuron lanes 280 and the corresponding synapse lanes 260 is partitioned into 16 independently operating subunits 205, each containing a single neuron lane 280 and 16 synapse lanes 260. Each synapse lane 260 processes a different filter for a total of 16. Every cycle, each subunit 205 fetches a single (neuron, offset) pair from NBin, uses the offset 285 to index the corresponding entry from its SBin to fetch 16 synapses and produces 16 products, one per filter 250. The backend is unchanged. It accepts the 16×16 products from 16 subunits 205 which are reduced using 16 adder trees 273. The adder trees 273 produce 16 partial output neurons which the unit accumulates using 64 NBout 230 entries which may be encoded by encoder 235 and communicated to the activation memory. The subunit NBin is 64 entries deep with each entry containing a 16-bit fixed-point value plus an offset field. The total SB capacity remains at 2 MB per unit as per the original DaDianNao design, with each subunit having an SB of 128 KB. Each subunit SB entry contains 16×16 bits corresponding to 16 synapses. In summary, each subunit corresponds to a single neuron lane and processes 16 synapses, one per filter. Collectively, all subunits have 16 neuron lanes, 256 synapse lanes and produce 16 partial output neurons each from a different filter.

The units according to embodiments of the present invention may be used to process both encoded and conventional neuron arrays. A configuration flag set by software for each layer controls whether the unit will use the neuron offset fields.

The design according to embodiments of the present invention perform the following to improve performance over the baseline: 1) generates the encoded neuron arrays on-the-fly; 2) keeps the units and all lanes busy; and 3) maintains orderly, wide accesses to the central eDRAM. A structural feature of embodiments of the present invention that enables this functionality is the format used to encode the input neuron arrays and in the way the work is divided across units.

This format is the Zero-Free Neuron Array Format (ZFNAf) shown in FIG. 7. ZFNAf enables embodiments of the present invention to avoid computations with zero-valued neurons. Only the non-zero neurons are stored, each along with an offset indicating its original position. The ZFNAf allows embodiments of the present invention to move the decisions of which neurons to process off the critical path and to place them at the end of the preceding layer. Accordingly, the ZFNAf effectively implements what would have otherwise been control flow decisions.

Specifically, ZFNAf encodes neurons as (value, offset) pairs in groups called bricks. Each brick corresponds to a fetch block of the DaDianNao design, that is an aligned, continuous along the input features dimension i group of 16 neurons, i.e., they all have the same x and y coordinates. Bricks are stored starting at the position their first neuron would have been stored in the conventional 3D array format adjusted to account for the offset fields and are zero padded. The grouping in bricks maintains the ability to index the activation array in the granularity necessary to process each layer.

Accordingly, in ZFNAf only the effectual activations are stored, each along with an offset indicating its original position. The ZFNAf is generated at the output of the preceding layer, where it typically would take several tens of cycles or more to produce each activation.

The ZFNAf encoding bears some similarity to the Compressed Sparse Row (CSR) format. However, CSR, like most sparse matrix formats that target matrices with extreme levels of sparsity have two goals: store only the non-zero elements and reduce memory footprint, ZFNAf only shares the first. In CSR, it is easy to locate where each row starts; however, to keep units busy, embodiments of the present invention allow direct indexing at a finer granularity sacrificing any memory footprint savings.

This grouping has two properties useful to embodiments of the present invention: 1) it maintains the ability to index into the neuron array at a brick granularity using just the coordinates of the first neuron of the brick, and 2) it keeps the size of the offset field short and thus reduces the overhead for storing the offsets. The first property allows work to be assigned to subunits independently and also allows embodiments of the present invention to easily locate where windows start. Bricks enable embodiments of the present invention to keep all subunits busy and to proceed independently of one another and thus skip over zeroes or start processing a new window as needed. FIG. 7 shows an example of the ZFNAf. Since embodiments of the present invention may use bricks of 16 neurons, the offset fields need to be 4-bit wide, a 25% capacity overhead for NM or 1 MB for the studied configuration. Given that the bulk of the area is taken up by the SBs (32 MB), overall the resulting area overhead proves small at 4.49%.

As described above, DaDianNao fetches a single fetch block of 16 neurons per cycle which it broadcasts to all 16 units. This block contains work for all synapse lanes across 256 filters. The same distribution of work across neuron lanes is not sufficient to keep all units busy for embodiments of the present invention. As FIG. 6B shows, a fetch block in ZFNAf contains a single brick which with the baseline work assignment would contain work for all neuron lanes only if the corresponding original neuron array group contained no zero neurons.

In order to keep the neuron lanes busy as much as possible, embodiments of the present invention assign work differently to the various neuron lanes. Specifically, while DaDianNao, as originally described, used a neuron interleaved assignment of input neurons to neuron lanes, embodiments of the present invention use a brick interleaved assignment.

By way of example, in DaDianNao if neuron lane 0 was given activation a(x,y,i), then neuron lane one would be given a(x,y,i+1). According to embodiments of the present invention, if a neuron lane is processing an activation brick starting at a(x,y,i), neuron lane 1 would be given the brick starting at a(x,y,i+16).

As FIG. 6B shows, the embodiment of the present invention divides the window evenly into 16 slices, one per neuron lane. Each slice corresponds to a complete vertical chunk of the window (all bricks having the same starting z coordinate). Each cycle, one neuron per slice is fetched resulting into a group of 16 neurons one per lane thus keeping all lanes busy. For example, let e(x, y, z) be the (neuron, offset) pair stored at location (x, y, z) of an input array in ZFNAf. In cycle 0, the encoded neurons at position e(0, 0, 0), e(0, 0, 16), . . . , e(0, 0, 240) will be fetched and broadcast to all units and processed by neuron lanes 0 through 15, respectively. As long as all 16 bricks have a second non-zero neuron, in cycle 1, e(0, 0, 1), e(0, 0, 17), . . . , e(0, 0, 241) will be processed. If, for example, brick 0 had only one non-zero neuron, in the next cycle the first neuron that will be fetched will be e(1, 0, 0) assuming an input neuron depth i of 256.

Since each neuron lane proceeds independently based on how many non-zero elements each brick contains, there is a different fetch pointer per neuron lane. A naive implementation would perform 16 single neuron accesses per cycle, unduly burdening the NM. The dispatcher, described below, presents a simple extension that requires the same number of 16-neuron-wide and aligned NM accesses as DaDianNao.

Since the order in which the input neurons are assigned to neuron lanes in the units has changed, there is also a change in the order in which the synapses are stored in the SBs as FIG. 6B shows. For example, in cycle 0, if j is the offset of e(0, 0, 0), Subunit 0 of Unit 0 will need $s^0$ (0, 0, j) through $s^{15}$(0, 0, j), Subunit 15 of Unit 0, will need $s^{15}$(0, 0, 240+j) through $s^{15}$(0, 0, 240+j), and Subunit 0 of Unit 15 will need to $s^{240}$(0, 0, j) through $s^{255}$(0, 0, j). This proves to be equivalent to transposing the SB store order per subunit. Since the synapses are known in advance this rearrangement can be done statically in software. Thus, accessing the appropriate synapses in parallel per subunit is straightforward.

This work assignment does not change the output neuron values that each unit generates, which remain identical to DaDianNao. The assignment only changes the order in which the input neurons are processed to produce an output neuron.

To avoid performing 16 independent, single-neuron-wide NM accesses per cycle, CNV uses a dispatcher unit that makes 16-neuron wide accesses to NM while keeping all neuron lanes busy. For this purpose, the subarrays the NM is naturally composed of are grouped into 16 independent banks and the input neuron slices are statically distributed one per bank. While the dispatcher is physically distributed across the NM banks, explaining its operation is easier if it is thought of as a centralized unit.

FIG. 8 shows that the dispatcher has a 16-entry Brick Buffer (BB) where each entry can hold a single brick. Each BB entry is connected to one NM bank via a 16-neuron-wide bus and feeds one of the neuron lanes across all units via a single-neuron-wide connection. For example, BB[0] accepts neuron bricks from NM bank 0 and can broadcast any of its neurons to neuron lane 0 in all units. Initially, the dispatcher reads in parallel one brick from each bank for a total of 16 neuron bricks. In subsequent cycles, the dispatcher broadcasts the non-zero neurons, a single neuron from each BB entry at a time, for a total of 16 neurons, one per BB entry and thus per neuron lane each cycle. Before all the non-zero neurons of a brick have been sent to the units, the dispatcher fetches the next brick from the corresponding NM bank. To avoid stalling for NM's response, the fetching of the next in processing order brick per bank can be initiated as early as desired since the starting address of each brick and the processing order are known in advance. Since the rate at which each BB will drain will vary depending on the number of non-zero neurons encountered per brick, the dispatcher maintains a per NM bank fetch pointer.

The dispatcher may issue up to 16 NM requests concurrently, one per slice/bank. In the worst case, when bricks happen to have only zero valued neurons, an NM bank will have to supply a new brick every cycle. This rarely happens in practice, and the NM banks are relatively large and are sub-banked to sustain this worst-case bandwidth.

In DaDianNao, a single 16-neuron wide interconnect is used to broadcast the fetch block to all 16 units. The interconnect structure remains unchanged according to embodiments of the present invention but the width increases to accommodate the neuron offsets.

The initial input to the DNNs studied are images which are processed using a conventional 3D array format. The first layer treats them as a 3-feature deep neuron array with each color plane being a feature. All other convolutional layers use the ZFNAf which embodiments of the present invention generates on-the-fly at the output of the immediately preceding layer.

According to embodiments of the present invention as in DaDianNao, output neurons are written to NM from NBout before they can be fed as input to another layer. Since the eDRAM NM favors wide accesses, these writes remain 16 neurons wide. However, before writing to the NM, each 16-neuron group is encoded into a brick in ZFNAf. This is done by the encoder subunit. One encoder subunit may exist per unit according to an embodiment of the present invention.

While embodiments of the present invention may process the input neuron array in an order different than DaDianNao, units according to embodiments of the present invention may still produce the same output neurons as DaDianNao. Each output neuron is produced by processing a whole window using one filter. The assignments of filters to units remain the same according to an embodiment of the present invention. Accordingly, the output neurons produced by a unit according to an embodiment of the present invention may correspond to a brick of the output neuron array. All the encoder unit has to do, is pack the non-zero neurons within the brick.

The encoder uses a 16-neuron input buffer (IB), a 16-encoded-neuron output buffer (OB), and an offset counter. Conversion begins by reading a 16-neuron entry from NBout into IB while clearing all OB entries. Every cycle the encoder reads the next neuron from IB and increments its offset counter. The neuron is copied to the next OB position only if it is nonzero. The current value of the offset counter is also written completing the encoded neuron pair. Once all 16 IB neurons have been processed, the OB contains the brick in ZFNMf and can be sent to NM. The same interconnect as in DaDianNao is used widened to accommodate the offset fields. The encoder can afford to do the encoding serially since: 1) output neurons are produced at a much slower rate, and 2) the encoded brick is needed for the next layer.

In DaDianNao, all units process neurons from the same window and processing the next window proceeds only after the current window is processed. Embodiments of the present invention may follow this approach avoiding further modifications to the unit's back-end and control. As neuron lanes process their bricks independently, unless all slices have exactly the same number of non-zero neurons, some neuron lanes will finish processing their window slice earlier than others. These neuron lanes will remain idle until all other lanes complete their processing.

Evaluation Methodology

The evaluation uses the set of popular and state-of-the-art convolutional neural networks as shown in the table provided in FIG. 9. These networks perform image classification on the ILSVRC12 dataset, which contains 256×256 images across 1000 classes. The experiments use a randomly selected set of 1000 images, one from each class. The networks are available, pre-trained for Caffe, either as part f the distribution or at the Caffe Model Zoo.

A cycle accurate simulator of the baseline accelerator and according to an embodiment of the present invention was used. The simulator integrates with the Caffe framework to enable on-the-fly validation of the layer output neurons. The area and power characteristics of the embodiment of the present invention and DaDianNao were measured with synthesized implementations. The two designs were implemented in Verilog and synthesized via the Synopsis Design Compiler with the TSMC 65 nm library. The NBin, NBout, and offset SRAM buffers were modeled using the Artisan single-ported register file memory compiler using double-pumping to allow a read and write per cycle. The eDRAM area and energy was modeled with Destiny.

Performance

FIG. 10 shows the speedup of the embodiment of the present invention over the baseline. The first bar (CNV) shows the speedup when only zero neurons are considered, while the second bar (CNV+Pruning) shows the speedup when additional neurons are also skipped without affecting the network overall accuracy. The rest of this section focuses on the first bar.

On average, the embodiment of the present invention improves performance by 37%, at most by 55% (cnnS) and at least by 24% (google). The performance improvements depend not only on the fraction of zero-valued neurons but also on the fraction of overall execution time taken by the corresponding layers (the evaluated embodiment of the present invention does not accelerate the first layer) and on the potential lost when subunits idle waiting for the current window to be processed by all others. While google exhibits a higher than average fraction of zero neurons, its first layer has a relatively longer runtime than the other networks accounting for 35% of the total runtime vs. 21% on average as measured on the baseline. Google also spends a higher portion of its timing computing other layers.

The performance results for the networks can be better understood by looking at the breakdown of where time goes in the baseline (b) and the embodiment of the present invention (c) per network as shown in FIG. 11. Execution activity is divided into the following categories: 1) processing non-convolutional layers (other), 2) executing the first convolutional layer (conv1), 3) processing non-zero neurons (non-zero), 4) processing zero neurons (zero), and 5) idling (stall). It is not possible to assign time units, that is cycles, uniquely to each category. For example, during the same cycle in the baseline some neuron lanes may be processing zero neurons while others maybe processing non-zero ones. In addition, in the embodiment of the present invention some neuron lanes may be idle waiting for all others to finish processing the current window. Accordingly, the figure reports a breakdown of execution activity which accounts for each neuron lane (equivalent to a subunit in the embodiment of the present invention) separately per cycle. The total number of events accounted for is: units×(neuron_lanes/unit)×cycles, resulting in a metric that is directly proportional to execution time and that allows each event to be assigned to a single category.

The results corroborate that the convolutional layers which include the first layer, dominate execution activity across all networks on the baseline. The relatively small fraction of activity where subunits of the embodiment of the present invention are idle demonstrates that the embodiment manages to capture most of the potential that exists from eliminating zero-valued neurons.

Area

FIG. 12 shows the area breakdown of the baseline architecture and the architecture according to an embodiment of the present invention. Overall, the embodiment of the present invention increases total area by only 4.49% over the baseline, a small overhead given the measured performance improvements. Area compares across the two architectures as follows: 1) the filter storage (SB) dominates total area for both architectures. While the embodiment according to the present invention partitions the SBin across subunits, the overhead for doing so is negligible as each chunk remains large (128 KB per subunit). 2) the embodiment according to the present invention increases the neuron memory (NM) area by 34% since it a) requires 25% more storage for the offsets and b) uses 16 banks. 3) The additional cost of the embodiment according to the present invention in the unit logic is negligible. 4) The embodiment according to the present invention increases the SRAM area by 15.8%. This is due to the additional buffer space dedicated to the storage of the offsets.

Power

FIG. 13 shows a breakdown of average power consumption in the baseline and the embodiment according to the present invention. Three bars are shown for each architecture corresponding to static, dynamic and overall power. Each category is further divided across the NM, SB, logic, and SRAM. The logic includes the datapath, control logic, the encoder and the memory dispatcher, while SRAM includes NBin and NBout. NM power is 53% higher in the embodiment according to the present invention than the baseline. This is expected, as NM is wider and banked. However, NM only accounts for 22% of the total chip power in the baseline so the overall power cost is small. The overhead of splitting the NBin and adding logic in the unit only increases its power by 2%. Reorganizing SB has little impact on its power cost and since synapses are not read when a subunit is stalled, the dynamic power of SB decreases by 18%. Overall, the 32 MB of SB account for most of the total power consumption, and the savings in dynamic SB energy outweigh the overheads in NM, logic and SRAM. As a result, the power cost of the embodiment of the present invention is 7% lower than the baseline on average.

EDP and ED2P

This section reports the Energy-Delay Product (EDP) and Energy-Delay Squared Product (ED2P) for the two architectures. While there is no unanimous consensus on how to properly compare two computing systems taking in consideration energy and performance, two commonly used metrics are the EDP and ED2P (ET 2). FIG. 14 reports the EDP and ED2P improvement of the embodiment of the present invention over the baseline. On average, the embodiment according to the present invention's EDP improves by 1.47× and ED2P by 2.01×.

Removing More Ineffectual Neurons

Pruning is a computation reduction technique in neural networks that removes ineffectual synapses or neurons. The architecture of embodiments of the present invention may allow for a form of dynamic neuron pruning by setting neuron values to zero so that their computation is skipped. To demonstrate this capability, this section considers a simple pruning approach where near zero neurons are set to zero when their magnitude is below a pre-specified, per-layer threshold. The baseline design incorporates comparators for max pooling which embodiments of the present invention reuse for threshold comparisons. The threshold value is determined in advance and is communicated with the layer meta-data, such as input dimensions, padding and stride.

To find a near optimal per-layer threshold configuration, exploration is done using gradient descent, similar to the approach used in previous work for finding per layer precision requirements. For simplicity, power of two thresholds were explored, however, the hardware could support any fixed-point threshold. Network accuracy was measured across 5000 images from the ImageNet validation set, sampled uniformly across each class.

FIG. 15 shows the trade-off between accuracy (y-axis) and performance (x-axis) when neurons are dynamically pruned using per-layer thresholds. The pareto frontiers of the explored configurations for each network are shown. The leftmost point for each network corresponds to the embodiment according to the present invention in FIG. 10 where only zero-valued neurons were removed. Generally, all networks exhibit an initial region where neurons can be pruned without affecting accuracy. This region is shown with a solid line in FIG. 15. The maximum speed-up without loss of accuracy is also reported as (CNV+Pruning) in FIG. 10. The table in FIG. 16 shows the thresholds that yield the highest speed-up without a loss in accuracy. On average, pruning may increase the speed-up to 1.52×, an increase of 11%. For google, thresholds are instead specified per 'inception module'.

For all networks, performance may improve further but at an accuracy loss with accuracy decaying exponentially with the performance improvement. For example, tolerating a drop in relative accuracy of up to 1% further increases the average performance improvement to 1.60× over the baseline, whereas allowing a drop in relative accuracy of up to 10% yields a 1.87× speedup over the baseline.

As described above, the ZFNAf format encodes the effectual neuron values by packing them at the beginning of the brick container. Their offsets were encoded separately using 4 bits per value for a brick of 16 values. This represents a 25% overhead for 16-bit values and brick s of 16 elements. According to an embodiment, alternative activation array formats may be provided that reduce memory overhead. For clarity, the discussion that follows uses examples where only zero-value activations are considered as ineffectual. However, the criterion can be more relaxed in practice.

RAW or Encoded Format (RoE)

This encoding uses just one extra bit per brick container at the expense of not being able to encode all possible combinations of ineffectual values. Specifically, the first bit of the brick specifies whether the brick is encoded or not. When the brick is encoded the remaining bits are used to store the neuron values and their offsets. As long as the number of effectual activations is such so that they fit in the brick container the brick can be encoded. Otherwise, all activation values are stored as-is, and the ability to skip the ineffectual activations would not be available for the specific brick. For example, bricks of size 4 and 16 bit values are provided. In total, each such brick requires 4×16=64 bits. A brick containing the values (1,2,0,0) can be encoded using 65 bits as follows: (1,(0,1),(1,2)). The first 1 means that the brick is encoded. The (offset,value)=(0,1) that follows uses two bits for the offset and 16 bits for the value. In total, the aforementioned brick requires 1+2×(16+4)=41 bits can fit within the 65 bits available. A brick containing the values (2,1,3,4) cannot fit within 65 bits and thus will be stored in raw format: (0,2,1,3,4) using 65 bits where the first 1 is a single bit indicating that the rest of the brick is not encoded and every value is 16 bits long.

Vector Ineffectual Activation Identifier Format (VIAI)

An alternative encoding leaves the activation values in place and uses an extra 16-bit bit vector I to encode which ones are ineffectual and thus can be skipped. For example, assuming bricks of 4 elements a brick containing (1,2,0,4) could be encoded as-is plus a 4 bit I vector containing (1101). For bricks of 16 activations each of 16 bits, this format imposes an overhead of 16/256, or 6.25%. Alternatively, the non-zero elements can be packed together and the vector can be used to derive their original offsets. For example, a brick containing (1,2,0,4) would be stored as (1,2,4,0) plus a 4-bit vector containing (1101). The advantage of this method is that it may be possible to avoid storing or communicating the zero activations.

Storing Only the Effectual Activations

Another format builds on VIM storing only the effectual values. For example, a 4-element activation brick of (1,0,0, 4) in VIAI would be stored as (1001,1,0,0,4). In the Compressed VIAI it would be stored instead as (1001,1,4). Here the two ineffectual zero activations were not stored in memory. Since now bricks no longer have a fixed size, a level of indirection is necessary to support fetching of arbitrary bricks. If the original activation array dimensions are (X,Y,I) then this indirection array IR would have (X,Y, [I/16]) pointers. These can be generated at the output of the preceding layer.

Further reduction in memory storage can be possible by storing activations at a reduced precision. For example, using the method of Patrick Judd, Jorge Albericio, Tayler Hetherington, Tor Aamodt, Natalie Enright Jerger, Raquel Urtasun, and Andreas Moshovos described in "Reduced-Precision Strategies for Bounded Memory in Deep Neural Nets", 2016, publicly accessible online via the Cornell University Library at: https://arxiv.org/abs/1511.05236, it is possible to determine precisions per layer in advance based on profiling. It may be possible to adjust precisions at a finer granularity. However, both the pointers and the precision specifier are overheads which reduce the footprint reduction possible.

In the original CNV implementation the ineffectual activations were "removed" at the output of the preceding layer. The ZFNAf incurs a memory storage overhead and the writes and reads of the activation offset values, require additional energy. This section describes an alternative dispatcher design that "eliminates" ineffectual activations while fetching them from the NM and prior to communicating these activation values to the tiles.

Specifically, processing for a layer starts by having the dispatcher, as described previously, fetch 16 activation bricks, one brick per neuron lane. The dispatcher then calculates the I (as described previously in the VIAI format) vectors on-the-spot using 16 comparators per brick, one per activation value.

The dispatcher then proceeds to communicate the effectual activations at a rate of one per cycle. When communicating an activation value, the dispatcher will send also the offset of the activation within its containing brick. For example, if the input activation brick contains (1,0,0,4), the dispatcher over two cycles will send to the tiles first (00b,1) ((offset,value)) followed by (11b,4). Once all effectual activation values have been communicated to the tiles, the dispatcher can then proceed to process another brick for the specific neuron lane. Many options exist for what should be the criterion for detecting ineffectual activations. For example, a simple comparison with zero, a comparison with an arbitrary threshold, or a comparison with a threshold that is a power of two could be used.

FIG. 17 shows an example, detailed brick buffer implementation of activation skipping in the dispatcher. For clarity, the figure shows only one of the 16 brick buffers 335 and assumes that bricks contain only eight activations. A second brick buffer 335 per activation lane (not shown) could overlap the detection and communication of the effectual activations from the current brick with the fetching of the next brick. More such brick buffers 335 may be needed to completely hide the latency of NM 330.

In FIG. 17, an activation brick 340 is shown that has just been placed into the brick buffer 335. Next to each brick buffer 335 entry there is an "ineffectual activation" (shown as a hexagon labeled as "In?") detector 345. These detectors 345 identify those activations that are ineffectual. As drawn, the output is set to zero if the activation is ineffectual. The collective outputs of these detectors form an E vector 350 which drives a "leading bit that is 1" detector 355. The output of this detector 355 is the offset of the first effectual activation which drives a decoder 320 that reads the activation value out from the brick buffer 335. The activation value and its offset is then broadcast to the tiles. The E vector 350 position for this activation is reset and the process continues with the next effectual activation. For this example, four cycles would be needed to communicate the four effectual activation values.

Skipping Ineffectual Synapses (Weights)

This section describes a further embodiment of the present invention which may also skip ineffectual weights. It is known that a large fraction of weights or synapses are ineffectual. For example, once precisions are trimmed per layer as per the methodology of Patrick Judd, Jorge Albericio, Tayler Hetherington, Tor Aamodt, Natalie Enright Jerger, Raquel Urtasun, and Andreas Moshovos described in "Reduced-Precision Strategies for Bounded Memory in Deep Neural Nets", 2016, publicly accessible online via the Cornell University Library at: https://arxiv.org/abs/1511.05236 a large fraction of weights becomes zero. Most likely, additional weights are ineffectual, for example, weights whose value is near zero. Other work has shown that networks can be also be trained to increase the fraction of weights that are ineffectual. Different than activations, weight values are available in advance and thus identifying which are ineffectual can be done statically. This information can be encoded in advance and conveyed to the hardware which can then skip the corresponding multiplications at run-time even when the corresponding activation value is non-zero (or, in general, effectual depending on the criterion being used for classifying activations as ineffectual).

As described earlier, each cycle, embodiments of the present invention processes 16 activations in parallel across 16 filters per unit. The number of activations and filters per unit are design parameters which can be adjusted accordingly. It will be assumed that both are 16 for this further embodiment of the present invention which skips ineffectual weights.

Without loss of generality the input neuron array may have a depth of 256 and a window stride of 1. For clarity, use $n^B(x,y,i)$ to denote an activation brick that contains $n(x,y,i) \ldots n(x,y,i+15)$ and where (i MOD 16)=0. Similarly, let $s^B f(x,y,i)$ denote a weight brick containing weights s $(x,y,i) \ldots s^f(x,y,i+15)$ of filter f and where again (i MOD 16)=0.

It is further assumed that for each input activation brick $n^B(x,y,i)$, a 16-bit vector $I^B(x,y,i)$ is available, whose bit j indicates whether activation $n(x,y,i+j)$ is ineffectual. There is one I(x,y, i) vector per input activation brick, hence i is divisible by 16. As with ZFNAf, the I vectors can be calculated at the output of the previous layer, or at runtime, as activation bricks are read from NM as per the discussion of the preceding section. For each weight brick, similar IS vectors are available. Specifically, for each weight brick $s^B f(x,y,i)$ where f is a filter, there is a 16-bit bit vector $IS^B_f(x,y,i)$ which indicates which weights are ineffectual. For example, bit j of $IS^B_0(x,y,i)$ indicates whether weight so(x, y,i+j) (filter 0) is ineffectual. The IS vectors can be pre-calculated and stored in an extension of the SB.

Without loss of generality, if at some cycle C, in the embodiment of the present invention starts processing the following set of 16 activation bricks in its 16 neuron lanes: Neuron lane 0 would be processing activations $n^B(x,y,0)$ while neuron lane 15 would be processing $n^B(x,y,240)$. If all activation values are effectual 16 cycles would be needed to process these 16 activation bricks. However, in the earlier described embodiments of the present invention the activation bricks are encoded so that only the effectual activations are processed.

In that case, all neuron lanes will wait for the one with the most effectual activations before proceeding with the next set of bricks. Equivalently, the same is possible if the positions of the effectual activations per brick are encoded using the aforementioned I vectors. The dispatcher performs a leading zero detection on the I vector per neuron lane to identify which is the next effectual activation to process for the lane. It then proceeds with the next zero bit in I until all effectual activations have been processed for the lane. When all neuron lanes have processed their effectual activations, all proceed with the next set of bricks.

Since now the IS vectors are also available all the dispatcher needs to do is to take them into account to determine whether an activation ought to be communicated. Specifically, since each activation is combined with 16 weights, each from a different filter, an effectual activation could be skipped if all corresponding weights are ineffectual. That is, each neuron lane can combine its single I vector with the 16 IS vectors for the corresponding weight bricks to determine which activations it should process. Specifically, a neuron lane processing $n^B(x,y,i)$ calculates each bit j of a Can Skip 16-bit vector as follows:

$$\text{Can Skip}^B(x, y, i, j) = \prod_{f=0}^{15} IS^B_f(x, y, j) + I^B(x, y, j)$$

and where the operations are boolean: the product is an AND and summation is an OR. That is, an activation value can be skipped if the activation is ineffectual as specified by I (activation vector) or if all corresponding weights are ineffectual. The higher the number of filters that are being processed concurrently, the lower the probability that an otherwise effectual activation will be skipped. For the original DaDianNao configuration which uses 16 tiles of 16 filters each, 256 weights, one per filter, will have to be ineffectual for the activation to be skipped. However, pruning has been known to be able to identify ineffectual weights and retraining has been known to increase the number of ineffectual weights. Both will increase opportunities for skipping additional neurons beyond what is possible according to earlier described embodiments of the present invention. Moreover, other configurations may process fewer filters concurrently, thus having a larger probability of combining an activation with weights that are all ineffectual.

It can be observed that in the above equation all the IS product terms are constants. As described in the earlier described embodiments of the present invention the same set of 16 weight bricks will be processed concurrently over different windows. Accordingly, the IS products (first term of the sum) can be pre-calculated and only the final result needs to be stored and communicated to hardware. For a brick size of 16 and for tiles that process 16 filters concurrently, the overhead drops from 16 bits per brick to 16 bits per 16 bricks. Assuming 16-bit weights, the overhead drops from $1/16^{th}$ to $1/256^{th}$.

FIGS. 18A to 18C shows an example of the operation of this further embodiment of the present invention which skips ineffectual weights. For clarity, the example assumes that the brick size is 4 and shows a tile that processes two filters in parallel and two weights (synapses) per filter. As part (b) shows it takes 3 cycles to process all input bricks as activation (neuron) brick $n^B(x,y,i+12)$ contains 3 effectual activations. However, as FIG. 18C shows, one of these effectual activations, specifically, $n(x,y, 13)=6$ would have been combined with weights $s^0(x,y,13)$ and $s^1(x,y,13)$ which are both 0 and hence ineffectual. This further embodiment of the present invention skips this computation and now the input activation bricks can all be processed in just 2 cycles. Additional effectual activations are skipped as well as they would have been combined with ineffectual weights.

According to an embodiment, an accelerator may also speed up backpropagation training procedures by selectively skipping values that are close to zero. In order to train neural networks, an accelerator may implement a process wherein classification errors are backpropagated and the network's weights are updated accordingly. In embodiments where performance depends on value magnitude, it may be advantageous to avoid small updates by thresholding errors according to some set criteria. In this manner, an engine can skip processing these values altogether. Depending on the neural network's particulars and the thresholding criteria, it may be the case that more training steps are required to achieve a certain classification accuracy since some weight updates are omitted, but each of these steps are performed in less time leading to an overall faster training procedure. According to an embodiment, a system may be provided for neural network training wherein backpropagated error values are set to 0 based on a dynamically or statically set threshold, and further, the system may omit weight update computations for error values of 0.

It is also noted that while portions of the above description and associated figures may describe or suggest the use of hardware, the present invention may be emulated in software on a processor, such as a GPU (Graphic Processing Unit) and may produce similar performance enhancements. Moreover, it is known that the terms "activation" and "neuron" as used are interchangeable in the art and literature, and the same is to be applied herein, without limitation. The neuron memory (NM) discussed above may be dedicated, shared, distributed, or a combination thereof according to desired implementation.

The present invention maybe embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A system for performing computations in layers in a neural network, comprising:
   one or more tiles for performing computations in the neural network, each tile receiving input neurons, offsets and synapses, wherein each input neuron has an associated offset, and generating output neurons;
   an activation memory for storing neurons and in communication with the one or more tiles via a dispatcher and an encoder,
   wherein the dispatcher reads neurons from the activation memory with their associated offsets and communicates the neurons with their associated offsets to the one or more tiles, and wherein the dispatcher reads synapses from a memory and communicates the synapses to the one or more tiles,
   and wherein the encoder receives the output neurons from the one or more tiles, encodes them and communicates the output neurons to the activation memory;
   and wherein the offsets are processed by the tiles in order to perform computations on only non-zero neurons,
   wherein the tile further receives one or more bits identifying synapses as ineffectual and the tile processes the one or more bits in order to perform computations on only non-zero neurons with effectual weights.

2. The system of claim 1, wherein the encoder encodes output neurons in a format paired with an associated offset.

3. The system of claim 1, wherein the encoder encodes output neurons in a zero-free neuron array format.

4. The system of claim 1, wherein at least one non-zero neuron below a threshold value is set to zero so that computation is not performed on it.

5. A system for performing computations of layers in a neural network, comprising:
   one or more tiles for performing, computations in the neural network, each tile receiving input neurons, offsets and synapses, wherein each input neuron has an associated offset, and generating output neurons;
   an activation memory for storing neurons and in communication with the one or more tiles via a dispatcher and an encoder,
   wherein the dispatcher reads neurons from the activation memory with their associated offsets and communicates the neurons with their associated offsets to the one or more tiles, and wherein the dispatcher reads synapses from a memory and communicates the synapses to the one or more tiles,
   and wherein the encoder receives the output neurons from the one or more tiles, encodes them and communicates the output neurons to the activation memory;
   and wherein the offsets are processed by the tiles in order to perform computations on only non-zero neurons,
   wherein the encoder encodes output neurons in RAW or Encoded format (RoE).

6. A system for performing computations of layers in a neural network, comprising:
   one or more tiles for performing computations in the neural network, each tile receiving input neurons, offsets and synapses, wherein each input neuron has an associated offset, and generating output neurons;
   an activation memory for storing neurons and in communication with the one or more tiles via a dispatcher and an encoder,
   wherein the dispatcher reads neurons from the activation memory with their associated offsets and communicates the neurons with their associated offsets to the one or more tiles, and wherein the dispatcher reads synapses from a memory and communicates the synapses to the one or more tiles, and wherein the encoder receives the output neurons from the one or more tiles, encodes them and communicates the output neurons to the activation memory;

and wherein the offsets are processed by the tiles in order to perform computations on only non-zero neurons, wherein the encoder encodes output neurons in Vector Ineffectual Activation Identifier (VIAI) format.

7. A system for performing computations of layers in a neural network, comprising:

one or more tiles for performing computations in the neural network, each tile receiving input neurons, offsets and synapses, wherein each input neuron has an associated offset, and generating output neurons;

an activation memory for storing neurons and in communication with the one or more tiles via a dispatcher and an encoder, wherein the dispatcher reads neurons from the activation memory with their associated offsets and communicates the neurons with their associated offsets to the one or more tiles, and wherein the dispatcher reads synapses from a memory and communicates the synapses to the one or more tiles, and wherein the encoder receives the output neurons from the one or more tiles, encodes them and communicates the output neurons to the activation memory;

and wherein the offsets are processed by the tiles in order to perform computations on, only non-zero neurons, wherein the encoder encodes output neurons in a compressed VIAI format.

8. An integrated circuit comprising an accelerator for use in performing computations in layers in a neural network, the integrated circuit comprising:

one or more tiles for performing computations in the neural network, each tile receiving input neurons, offsets and synapses, wherein each input neuron has an associated offset, and generating output neurons;

an activation memory for storing neurons and in communication with the one or more tiles via a dispatcher and an encoder, wherein the dispatcher reads neurons from the activation memory with their associated offsets and communicates the neurons with their associated offsets to the one or more tiles, and wherein the dispatcher reads synapses from a memory and communicates the synapses to the one or more tiles, and wherein the encoder receives the output neurons from the one or more tiles, encodes them and communicates the output neurons to the activation memory;

and wherein the offsets are processed by the tiles in order to perform computations on only non-zero neurons, wherein the tile further receives one or more bits identifying synapses as ineffectual and the tile processes the one or more bits in order to perform computations on only non-zero neurons with effectual weights.

9. The integrated circuit of claim 8, wherein the encoder encodes output neurons in a format paired with an associated offset.

10. The integrated circuit of claim 8, wherein the encoder encodes output neurons in a zero-free neuron array format.

11. The integrated circuit of claim 8, wherein the encoder encodes output neurons in RAW or Encoded format (RoE).

12. The integrated circuit of claim 8, wherein the encoder encodes output neurons in Vector Ineffectual Activation Identifier (VIAI) format.

13. The integrated circuit of claim 8, wherein the encoder encodes output neurons in a compressed VIAI format.

14. The integrated circuit of claim 8, wherein at least one non-zero neuron below a threshold value is set to zero so that computation is not performed on it.

15. A method for reducing ineffectual operations in performing computations in a neural network, the method comprising:

identifying non-zero neurons in a neuron stream and creating an offset value for each neuron;

communicating the offset value for each neuron with the neuron to a tile which processes the neuron;

the tile using the offset value to identify the non-zero neurons to perform computations on;

the tile performing computations only on the non-zero neurons and generating output neurons; and storing output neurons in an activation memory, wherein the tile receiving one or more bits identifying synapses as ineffectual and processing the one or more bits in order to perform computations on only non-zero neurons with effectual weights.

16. The method of claim 15, the method further comprising encoding the output neurons with associated offset values.

17. The method of claim 16, wherein the encoding is in a zero-free neuron array format.

18. The method of claim 16, wherein the encoding is in a RAW or Encoded format (RoE).

19. The method of claim 16, wherein the encoding is in a Vector Ineffectual Activation Identifier (VIAI) format.

20. The method of claim 16, wherein the encoding is in a compressed VIAI format.

21. The method of claim 15, further comprising setting at least one non-zero neuron below a threshold value to zero so that computation is not performed on it.

* * * * *